US012714981B1

(12) United States Patent
Brown et al.

(10) Patent No.: US 12,714,981 B1
(45) Date of Patent: Aug. 25, 2026

(54) LIQUID COMPOSITIONS, USES AND METHOD OF MAKING THE SAME

(71) Applicant: STEWART SUPERABSORBENTS, LLC, Hickory, NC (US)

(72) Inventors: Steven E. Brown, Greensboro, NC (US); Jeff Lichiello, Greensboro, NC (US); William David Carter, Greensboro, NC (US)

(73) Assignee: STEWART SUPERABSORBENTS, LLC, Hickory, NC (US)

(*) Notice: Subject to any disclaimer, the term of this patent is extended or adjusted under 35 U.S.C. 154(b) by 680 days.

(21) Appl. No.: 18/120,758

(22) Filed: Mar. 13, 2023

Related U.S. Application Data

(60) Provisional application No. 63/319,476, filed on Mar. 14, 2022.

(51) Int. Cl.

| | |
|---|---|
| ***B01J 20/00*** | (2006.01) |
| ***B01J 20/26*** | (2006.01) |
| ***B01J 20/28*** | (2006.01) |
| ***B01J 20/32*** | (2006.01) |
| ***C08F 2/10*** | (2006.01) |

(Continued)

(52) U.S. Cl.
CPC ....... *B01J 20/261* (2013.01); *B01J 20/28023* (2013.01); *B01J 20/3282* (2013.01); *C08F 2/10* (2013.01); *C08F 2/44* (2013.01); *C08F 220/56* (2013.01); *C08K 5/1535* (2013.01); *C08K 5/17* (2013.01); *C08K 2201/003* (2013.01)

(58) Field of Classification Search
CPC ................ B01J 20/261; B01J 20/28023; B01J 20/3282; C08F 2/10; C08F 2/44; C08F 220/56; C08K 5/1535; C08K 5/17; C09K 2201/003
USPC ........................................................ 502/402
See application file for complete search history.

(56) References Cited

U.S. PATENT DOCUMENTS 4,598,119 A 7/1986 Volk
9,149,789 B2 * 10/2015 Holt ........................ A61L 15/60
(Continued)

FOREIGN PATENT DOCUMENTS

EP 0726028 A2 8/1996
KR 20160074204 A * 6/2016 ................ C08F 2/48
(Continued)

OTHER PUBLICATIONS

Atascientific.com [online], "Basic principles of particle size analysis," 2014, retrieved on Apr. 23, 2024, retrieved from URL<https://www.atascientific.com.au/wp-content/uploads/2017/02/AN020710-Basic-Principles-Particle-Size-Analysis.pdf>, 19 pages.
(Continued)

*Primary Examiner* — James E McDonough
(74) *Attorney, Agent, or Firm* — Fish & Richardson P.C.

(57) ABSTRACT

This disclosure generally relates to liquid compositions that are suitable to provide absorbent materials (e.g., hydrogel coating compositions), and methods of preparing the compositions and absorbent materials thereof. The compositions can include a first polymer type including one or more acrylate polymer, a second polymer type including one or more non-acrylate polymer, a crosslinking agent, and water. The compositions are suitable to provide an absorbent material having a water absorption capacity of at least about 50 grams of water per gram of absorbent material.

23 Claims, 24 Drawing Sheets

(51) Int. Cl.

| | |
|---|---|
| ***C08F 2/44*** | (2006.01) |
| ***C08F 220/56*** | (2006.01) |
| ***C08K 5/1535*** | (2006.01) |
| ***C08K 5/17*** | (2006.01) |

(56) References Cited

U.S. PATENT DOCUMENTS

| | | | |
|---|---|---|---|
| 2009/0151963 | A1 | 6/2009 | Sortwell |
| 2016/0272769 | A1 | 9/2016 | Holt |
| 2021/0129505 | A1 | 5/2021 | Mishra et al. |
| 2021/0130070 | A1 | 5/2021 | Zhu et al. |
| 2021/0130752 | A1 | 5/2021 | Mishra et al. |
| 2021/0380446 | A1 | 12/2021 | Holt |
| 2022/0387227 | A1 | 12/2022 | Kreisel et al. |
| 2023/0096385 | A1 | 3/2023 | Ferracane et al. |
| 2023/0234028 | A1 | 7/2023 | Collias et al. |
| 2023/0363954 | A1 | 11/2023 | Ehrnsperger et al. |
| 2025/0041827 | A1 | 2/2025 | Brown et al. |

FOREIGN PATENT DOCUMENTS

| | | |
|---|---|---|
| KR | 10-2022-0021303 A | 2/2022 |
| WO | WO 9640849 A1 | 12/1996 |

OTHER PUBLICATIONS

Brunauer et al., "Adsorption of Gases in Multimolecular Layers," Journal of the American Chemical Society, 1938, 60(2):309-319 (abstract only).

Burgess et al., "Particle Size Analysis: AAPS Workshop Report, Cosponsored by the Food and Drug Administration and the United States Pharmacopeia," AAPS Journal, 2004, 6(3):1-12.

Characterization of Porous Solids and Powders: Surface Area, Pore Size and Density, Particle Technology Series (POTS, vol. 16), 1st ed., 2004, 365 pages (abstract only).

Handbook of Pharmaceutical Excipients, 6th edition Pharmaceutical Press, London, England, 2009, 917 pages (abstract only).

Hansen Solubility Parameters: A User's Handbook, Second Edition, CRC Press, 2007, 546 pages (abstract only).

Hansen-solubility.com [online], "Welcome to the official site of HSP and HSPiP," available on or before Jun. 21, 2023, retrieved on Apr. 23, 2024, retrieved from URL<https://www.hansen-solubility.com/>, 4 pages.

Modern Superabsorbent Polymer Technology, Wiley, Nov. 1997, 304 pages (abstract only).

Thommes et al., "Physisorption of gases, with special reference to the evaluation of surface area and pore size distribution (IUPAC Technical Report)," Pure and Applied Chemistry, Jul. 2, 2015, 87(9-10):1051-1069.

Methods and Application of Particle Size Analysis, Cambridge University Press, 1st Ed., 1991, 368 pages (abstract only).

* cited by examiner

LIQUID COMPOSITIONS, USES AND METHOD OF MAKING THE SAME

RELATED APPLICATION

This application claims the benefit under 35 U.S.C. § 119(e) of U.S. provisional application No. 63/319,476, filed Mar. 14, 2022, which is incorporated by reference herein in its entirety.

FIELD OF INVENTION

The present disclosure relates to liquid compositions suitable to provide an absorbent material (e.g., hydrogel coating compositions), uses, and methods of making the same.

BACKGROUND

Superabsorbent hydrogel networks are comprised of a particular group of polymer materials capable of absorbing and holding large quantities of water in a three-dimensional network, yet they do not dissolve in water. The nature of the functional groups attached to the polymer backbone give rise to the hydrogel's ability to absorb water while crosslinking between polymer chains prevent dissolution of the functional polymers. Furthermore, hydrogel polymers can be naturally occurring or synthetic.

SUMMARY

In one aspect, described herein are examples of a liquid composition that can include a first polymer type comprising one or more acrylate polymer, a second polymer type comprising one or more non-acrylate polymer, a crosslinking agent, and water. The crosslinking agent is suitable for crosslinking the acrylate polymer of the first polymer type, the acrylate polymer of the first polymer type with the non-acrylate polymer of the second polymer type, the non-acrylate polymer of the second polymer type, or a combination thereof. The liquid composition is suitable to provide an absorbent material having a water absorption capacity of at least about 50 grams of water per gram of absorbent material.

In an aspect, the first polymer type and the second polymer type have a weight ratio of about 1:0.3. In an aspect, an amount of the second polymer type is about equal to or greater than the first polymer type. In an aspect, the first polymer type and the second polymer type have a weight ratio of about 1:1. In an aspect, the first polymer type and the second polymer type have a weight ratio of about 1:2.5.

In an aspect, the acrylate polymer is a homopolymer, copolymer or mixture thereof.

In an aspect, the acrylate polymer is anionic, cationic, or zwitterionic. In an aspect, wherein the acrylate polymer includes one or more functional groups selected from carboxylic acids, acrylamides, sulfonates, metal salts or combinations thereof.

In an aspect, the acrylate polymer has a formula of

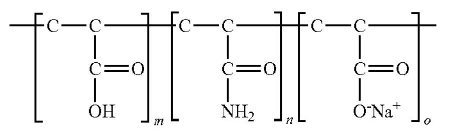

wherein m is a mole fraction of the carboxylic acid, n is a mole fraction of the acrylamide, and n is the mole fraction of the metal salt, whereby the sum of m, n, and o is 100%.

In an aspect, the acrylate polymer has a molecular weight less than about 100,000 kilodaltons. In an aspect, the acrylate polymer has a molecular weight less than about 10,000 kilodaltons.

In an aspect, the non-acrylate polymer is a homopolymer, copolymer or mixture thereof.

In an aspect, the non-acrylate polymer is a water-soluble polymer. In an aspect, the water-soluble polymer is polyethylene glycol.

In an aspect, the non-acrylate polymer is nonionic.

In an aspect, the non-acrylate polymer is linear, branched, cyclic or a combination thereof.

In an aspect, the non-acrylate polymer includes one or more functional groups selected from OH, $NH_2$, Cl, Br, carbocyclic, sulfonate, esters, ethers, amides, urethane, quaternary amines, and organic salts.

In an aspect, the crosslinking agent is selected from a chemical crosslinker, a thermal crosslinker, or a photochemical crosslinker. In an aspect, the crosslinking agent is selected from polyepichorohydrin amines, quaternary amines, amides peroxides, peroxodisulfate, photoactive transition metal catalysts, brominate acrylates, polyaldehydes, polyhydroxy polymers, and propenyl compounds. In an aspect, the liquid composition comprises between about 0.01 wt. % to about 10 wt. % of the crosslinking agent.

In an aspect, the liquid composition comprises at least 75 wt. % water. In an aspect, the liquid composition comprises at least 80 wt. % water. In an aspect, the liquid composition comprises at least 87 wt. % water.

In an aspect, the liquid composition further includes one or more additives. In an aspect, the additive is selected from fumed silica, aluminosilicate clays, carbon black, pigments, surfactants, plasticizers, adhesion promoters, yarn processing aids, silicones, sizing agents, biocides, conducting particles, conducting polymers, non-conducting particles, non-conducting polymers, pigments and combinations thereof. In an aspect, the yarn processing aid is an oil or lubricant. In an aspect, the additive has an average diameter of less than about 50 microns.

In an aspect, the liquid composition is applied to a substrate. In an aspect, the liquid composition is crosslinked and applied to the substrate simultaneously.

In an aspect, the liquid composition is coated onto the substrate. In an aspect, the liquid composition is uniformly coated onto the substrate. In an aspect, the liquid composition is non-uniformly coated onto the substrate. In an aspect, the liquid composition is coated onto the substrate as a pattern. In an aspect, the liquid composition is coated onto the substrate using dip coating or roll coating.

In an aspect, wherein the liquid composition is printed onto the substrate. In an aspect, wherein the liquid composition is printed onto the substrate using an ink jet printer or a print screen.

In an aspect, the liquid composition has a viscosity less than about 500 centipoise at 23° C. In an aspect, the liquid composition has a total solids content equal to or less than about 25 wt. %. In an aspect, the viscosity is less than about 250 centipoise at 23° C. In an aspect, the viscosity is less than about 100 centipoise at 23° C. In an aspect, the viscosity increases no greater than about 20% within at least 3 months. In an aspect, the viscosity is equal to or less than about 200 centipoise at 23° C. and the total solids content is less than about 10 wt %.

In an aspect, the liquid composition is aerosolized. In an aspect, the aerosolized liquid composition has a median drop size of less than about 500 microns.

In one aspect, described herein are examples of an absorbent material formed by crosslinking a liquid composition described herein. In an aspect, the absorbent material has a water content less than about 30 wt. %. In an aspect, the absorbent material has a water content less than about 15 wt. %. In an aspect, the absorbent material has a water content less than about 10 wt. %.

In an aspect, the absorbent material has a water absorption capacity of at least about 200 grams of water per gram of absorbent material. In an aspect, the absorbent material has a water absorption capacity of at least about 450 grams of water per gram of absorbent material. In an aspect, the absorbent material has a water absorption capacity of at least about 600 grams of water per gram of absorbent material.

In an aspect, the absorbent material has a water absorption rate of at least 80% of the water absorption capacity within 30 seconds of exposure to water. In an aspect, the absorbent material has a water absorption rate of at least 90% of the water absorption capacity within 30 seconds of exposure to water.

In an aspect, the absorbent material is conductive. In an aspect, the absorbent material is flexible. In an aspect, the absorbent material does not delaminate upon flexure.

In one aspect, described herein are examples of a method of forming an absorbent material including providing a liquid composition comprising: a first polymer type comprising one or more acrylate polymer, a second polymer type comprising one or more non-acrylate polymer, a crosslinking agent, wherein the crosslinking agent is suitable for crosslinking the acrylate polymer of the first polymer type, the acrylate polymer of the first polymer type with the non-acrylate polymer of the second polymer type, the non-acrylate polymer of the second polymer type, or a combination thereof, and water; and activating the liquid composition to form an absorbent material.

In an aspect, activating the liquid composition comprises thermally activating the liquid composition at a temperature of at least about 100° C.

In an aspect, activating the liquid composition comprises crosslinking the liquid composition and removing the water to achieve a water content of less than about 10 wt %. In an aspect, removing the water comprises thermally activating the liquid composition at about 105° C.

In an aspect, activating the liquid composition is performed in an air atmosphere. In an aspect, activating the liquid composition is performed in a non-oxygen containing atmosphere.

In an aspect, crosslinking the liquid composition comprises crosslinking the liquid composition thermally, chemically, or photochemically. In an aspect, photochemically crosslinking the liquid composition comprises applying microwave, ultrasonic or ultraviolet light to the liquid composition.

In an aspect, the method further includes aerosolizing the liquid composition to form an aerosolized liquid composition. In an aspect, the method further includes spray drying the aerosolized liquid composition onto a substrate. In an aspect, wherein spray drying the aerosolized liquid composition onto the substrate and activating the liquid composition to form the absorbent material is performed simultaneously.

In an aspect, the method further includes applying the liquid composition to a substrate.

In an aspect, applying the liquid composition to the substrate includes applying the liquid composition as a uniform coating. In an aspect, applying the liquid composition to the substrate includes applying the liquid composition as a non-uniform coating. In an aspect, applying the liquid composition as a non-uniform coating includes applying the liquid composition in a pattern.

In an aspect, applying the liquid composition to a substrate includes co-extruding the liquid composition with the substrate.

In an aspect, applying the liquid composition to a substrate includes coating the liquid composition onto the substrate. In an aspect, coating the liquid composition onto the substrate includes dip coating the liquid composition onto the substrate. In an aspect, coating the liquid composition onto the substrate includes roll coating the liquid composition onto the substrate.

In an aspect, applying the liquid composition to a substrate includes printing the liquid composition onto the substrate. In an aspect, printing the liquid composition onto the substrate includes screen printing the liquid composition onto the substrate. In an aspect, printing the liquid composition onto the substrate includes gravure printing the liquid composition onto the substrate. In an aspect, wherein printing the liquid composition onto the substrate includes printing the liquid composition onto the substrate with an ink jet printer.

In an aspect, applying the liquid composition to the substrate includes applying the liquid composition to a fiber, a pulp or a finely divided substrate. In an aspect, applying the liquid composition to the fiber includes applying the liquid composition to a yarn. In an aspect, applying the liquid composition to the yarn includes applying the liquid composition to an aramid yarn.

In an aspect, the method further includes pre-coating the substrate before applying the liquid composition to the substrate. In an aspect, precoating the substrate includes precoating the substrate with polyurethane.

In an aspect, applying the liquid composition to the substrate and activating the liquid composition to form the absorbent material is performed simultaneously.

In an aspect, the method further includes incorporating the absorbent material into a product. In an aspect, the product is a hygiene product. In an aspect, the product is a diaper. In an aspect, the product is a woven article.

In an aspect, the absorbent material is incorporated into the product as a sensor. In an aspect, the method further includes sensing a change in conductance, resistance or capacitance with the sensor. In an aspect, the method further includes communicating the change to a user.

In an aspect, the liquid composition has a viscosity of less than about 500 centipoise at 23° C. and the liquid composition has a total solids content equal to or less than about 25 wt. %.

In an aspect, the substrate includes a woven material or a nonwoven material. In an aspect, the woven material is a polyester yarn or an aramid yarn. In an aspect, the nonwoven material is a polypropylene nonwoven or a cellulosic nonwoven.

In one aspect, described herein are examples of a coated substrate (e.g., a substrate coated with an absorbent material disclosed herein) prepared according to a method disclosed herein. In an aspect, the absorbent material has a water absorption capacity of at least 100 grams of water per gram of absorbent material.

In one aspect, described herein are examples of a substrate coated with an absorbent material including a first polymer type comprising one or more acrylate polymer, and a second polymer type comprising one or more non-acrylate polymer; wherein the absorbent material has a water absorption capacity of at least about 200 grams of water per gram of absorbent material and a water absorption rate of at least 80% of the water absorption capacity within 30 seconds of exposure to water.

In an aspect, the substrate is a fiber. In an aspect, the fiber is a synthetic fiber. In an aspect, the fiber is a natural fiber. In an aspect, the fiber is a yarn. In an aspect, the fiber is incorporated into a woven textile. In an aspect, the fiber is incorporated into a non-woven textile.

In one aspect, described herein are examples of a method of forming a coated substrate including providing a liquid composition including: a first polymer type comprising one or more acrylate polymer, a second polymer type comprising one or more non-acrylate polymer, a crosslinking agent, wherein the crosslinking agent is suitable for crosslinking the acrylate polymer of the first polymer type, the acrylate polymer of the first polymer type with the non-acrylate polymer of the second polymer type, the non-acrylate polymer of the second polymer type, or a combination thereof, and water; applying the liquid composition to a substrate; and activating the liquid composition to form an absorbent coating on the substrate.

Any two or more of the features described in this specification, including in this summary section, can be combined to form implementations not specifically described herein. The details of one or more implementations are set forth in the accompanying drawings and the description below. Other features and advantages will be apparent from the description and drawings, and from the claims.

Figure 21:
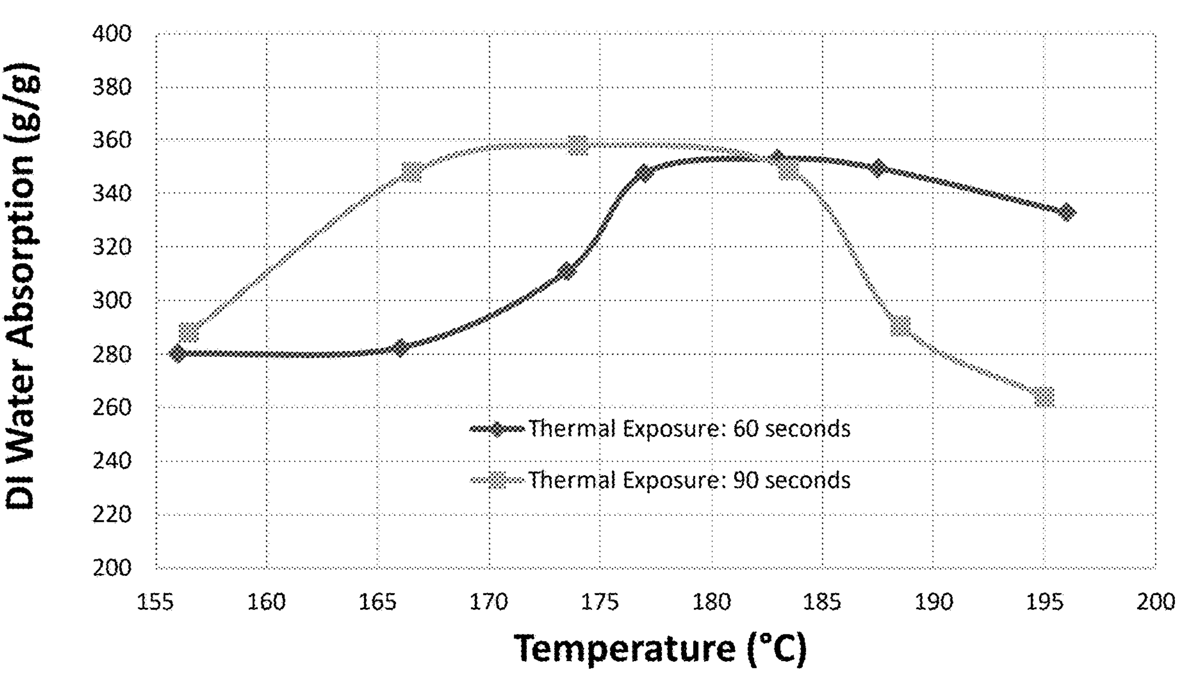

FIG. 21 is a graph showing water absorption versus curing temperature, when the example liquid composition is exposed to the temperature for 60 seconds or 90 seconds.

DETAILED DESCRIPTION

Synthetic polymers can be synthesized as homopolymers or copolymers with specific functional groups to alter physico-chemical characteristics and water absorption properties of the polymers upon crosslinking. Furthermore, the specific physical properties can be tailored through selecting specific crosslinking chemistries and manufacturing processes known in the art to control overall quantity of water absorption, ability to swell under pressure, rate of absorption and the like. Examples of superabsorbent hydrogel materials include polymers formed from acrylic acid, acrylamide, propenyl sulfonate, and metal salts of the same. These types of superabsorbent hydrogel materials can absorb up to 1000 times their own weight in water or other aqueous liquids, allowing for broad commercial applications. Such commercial applications include, but are not limited to, medical waste such as blood absorption, wound care such as bandages and negative pressure dressings, patient care such as incontinent pads and other body fluids, and dental applications for absorption of saliva. Still other commercial applications include hot and cold gel packs, packaging such as absorbent pads for meats and produce, pet care, apparel, mining drilling, filtration, wastewater remediation, and agriculture/horticulture, and special effects novelty. In recent years, absorbent materials have been used in more specialized applications beyond primary applications in personal hygiene, diaper products, and general commercial applications.

Hydrogel networks can be comprised of two or more multicomponent polymer systems forming a three-dimensional structure. An important class of this type of hydrogels is known as an interpenetrating polymeric hydrogel (IPN). An IPN is made of two or more independent cross-linked synthetic and/or natural polymer components that form a singular network structure. In a semi-IPN hydrogel, one component is a cross-linked polymer and the other component is a non-cross-linked polymer. In a double network hydrogel, the two interpenetrating networks have contrasting chemical and physical characteristics (i.e., brittle vs non-brittle). These types of double network hydrogels are in sharp contrast to homopolymeric hydrogels derived from a single monomer species and have a cross-linked skeletal structure depending on the nature of the monomer and polymerization technique. Likewise, double network hydrogels differ from copolymer hydrogels comprised of two or more different monomer species with at least one hydrophilic component, arranged in a random, block or alternating configuration along the chain of the polymer network.

While there are many manufacturing routes to produce superabsorbent materials from homopolymer and copolymer types (also known as super absorbent polymers), these superabsorbent materials are generally solid dry granular materials. A particular application of interest is imparting water absorbent characteristics to tapes, fabrics both woven and non-woven, filaments, yarns and the like by adhering granular hydrogel material to their surfaces. These functionalized materials can be further incorporated into electric transmission lines, fiber optics cable, or other coaxial cable applications. While these applications and methods to impart water absorbing properties are well known in the art, there are several significant drawbacks and limitations that exist. Namely, complex manufacturing processes to handle and apply fine granular superabsorbent polymers, variation in particle size distribution that can impact water absorption performance in both speed and quantity, difficulty achieving coating uniformity, and the surface of finished goods is rough and non-smooth leading to further processing difficulties. In addition, poor adhesion of particulate absorbent material can lead to flaking and dusting. Lastly, a typical process requires an adhesives/binder to affix particles, which can subsequently impede water uptake and efficiency, and increase cost. In addition, product design complexity may significantly increase to accommodate a dry granular material to prevent dusting, or loss of water absorption performance.

Industry has attempted to overcome these issues by forming superabsorbent hydrogel coatings directly on substrate in situ. Specifically, highly concentrated monomeric or polymeric pre-cursor aqueous solutions of poly acrylate, poly acrylamide, sulfonate, etc. are used to coat filaments and yarns. Liquid formations of this type can be applied using known coating techniques and processing equipment (dip coating, knife coating, etc.). Subsequent processing is required to crosslink the polymers by radiative (thermal, UV), chemical, or by other means. Residual water is removed by a post thermal process, effectively creating a dry hydrogel polymer network coating capable of absorbing water or other aqueous liquids. While liquid polymer formulations have found some success, there are limitations to the utility of superabsorbent hydrogel coatings created in this manner. Typically, liquid polymer formulations have significantly high viscosity which can negatively impact coating speed during processing and impede liquid penetration into a tow, and potentially poor surface wetting characteristics leading to poor surface coating uniformity and thickness, all of which may negatively impact absorption properties. In general, these types of liquid formulations have excessively high viscosity due to the minimum polymer molecular weight necessary to form an effective superabsorbent hydrogel network. In addition, dry polymer hydrogel coatings on flexible yarns and filaments are rigid and brittle due to the nature of crosslinked acrylate polymers. This in turn can lead to undesirable flaking or dusting during processing. Some methods attempt to overcome poor coating adhesion and brittleness by creating complex liquid formulations that contain adhesion promotors, plasticizers, and other film formers, all of which can negatively impact overall water absorption capacity, coating efficiency, absorption speed, and decrease shelf life of the polymer solution due to undesirable polymer-polymer interactions. Alternatively, other complex schemes to impart superabsorbent hydrogel coatings have been described. Namely, incorporation of granular superabsorbent polymers in plastisol compositions. In this case, the efficiency of the water swelling capability of the granular superabsorbent hydrogel polymer is greatly reduced. To achieve desirable water absorption capacity, heavier coatings must be applied which in turn exacerbates the negative characteristics described above.

The present disclosure provides an interpenetrating network hydrogel comprised of at least two different polymer types capable of forming a superabsorbent material with similar properties to traditional superabsorbent materials comprised of a singular polymer type.

The present disclosure provides liquid compositions suitable to provide an absorbent material (e.g., superabsorbent hydrogel coatings), uses, and methods for making the same. For example, the present disclosure provides polymer compositions, for example, a low viscosity aqueous polymer composition capable of forming a superabsorbent double network hydrogel coating on solid and flexible substrates when applied and subsequently thermally activated. The resulting absorbent material can be non-brittle and flexible with superior adhesion on coated surfaces. For example, coatings of 8 to 12 weight percent hydrogel polymer on a plurality of filaments are capable of water (deionized) absorption of about 45 grams per gram filament within 1 minute of water immersion. In some implementations, the thermally activated hydrogel polymer composition can absorb about 450 g water (deionized) per gram dried hydrogel within 1 minute of exposure.

The present disclosure describes compositions and utility of a superabsorbent interpenetrating network hydrogel comprised of at least one acrylate copolymer, or acrylate polymer, and at least one non-acrylate polymer. In some implementations, the non-acrylate polymer constitutes the majority of the percent solids in an aqueous composition. The compositions can be thermally treated and cross-linked to form an interpenetrating network hydrogel that is essentially free of water and capable of forming a flexible superabsorbent coating on rigid and non-rigid substrate with high water absorption capacity and speed. In addition, industrial use and applications of the composition are provided. The liquid compositions disclosed herein comprise an aqueous polymer solution. In some implementations, the water content of the composition is at least 75% by weight, such as at least 80% by weight or at least 87% by weight. The remaining formulation can include functional components necessary to form a single gel comprised of two independent and interpenetrating networks with novel properties and performance described herein. Functional components can be based on synthetic or natural polymers.

Provided herein is a liquid composition comprising a first polymer type comprising one or more acrylate polymer, a second polymer type comprising one or more non-acrylate polymer, a crosslinking agent, wherein the crosslinking agent is suitable for crosslinking the acrylate polymer of the first polymer type, the acrylate polymer of the first polymer type with the non-acrylate polymer of the second polymer type, the non-acrylate polymer of the second polymer type, or a combination thereof, and water; wherein the liquid composition is suitable to provide an absorbent material having a water absorption capacity of at least about 50 grams of water per gram of absorbent material.

In some implementations, the liquid composition comprises polymers of two types: a first polymer type and a second polymer type, wherein the first type is essentially a rigid polymer and the second type is essentially a flexible polymer. An example combination has been found wherein the first polymer type is a rigid polyelectrolyte and the second polymer type is a flexible neutral polymer. In some implementations, the second polymer type constitutes the majority of the functional components in the composition.

The first polymer type (also referred to herein as "Type 1 polymer") can be singular or a plurality of polymers of varying molecular weight, type, functionalities, or physical mixtures thereof. Functional groups of the first polymer type can include, but are not limited to, carboxylic acid, acrylamide, sulfonate, or metal salts thereof. In addition, functional groups or moieties can be selected based on ability of the functional group to participate in crosslinking reactions. In some implementations, the first polymer type comprises synthetic polymers, for example, polymers based on silicones chemistries suitable for aqueous compositions. In some implementations, the first polymer type comprises natural polymers. Natural polymers include, but are not limited to, alginates, cellulosic, chitosan, collagen, and starches which can be further functionalized to effectively crosslink.

In some implementations, the first polymer type comprises one or more acrylate polymer. In some implementations, the acrylate polymer is a homopolymer, copolymer, or mixture thereof. In some implementations, the acrylate polymer is anionic, cationic, or zwitterionic. In some implementations, the acrylate polymer includes one or more functional groups selected from carboxylic acids, acrylamides, sulfonates, metal salts or combinations thereof.

Example polymers of the first polymer type include copolymers with the chemical structure shown in Formula 1, where m, n, o denotes mole fraction of each functional group. It is understood that the sum of m, n, and o is 100%. Furthermore m, n, and o can be any numerical value wherein at least any two are greater than 0 and the sum of m, n, and o equal 100%.

Formula 1

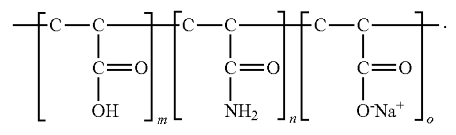

In addition, the first polymer type can comprise mixtures of copolymers and homopolymers of similar or differing functionalities, molecular weights, and acid base properties such as pKa. In addition, the neutral homopolymers or copolymers can be protonated or deprotonated in the composition using organic or inorganic acids and bases to create ionically charged functional groups. Functional groups can be anionic, cationic, or amphoteric, including Zwitterionic (polybetaines).

In some implementations, the molecular weight of the first polymer type is less than about 100,000 kilodaltons (KDa) or such that the polymer molar mass is less than the entanglement point according to known polymer theory. In some implementations, the molecular weight of the the first polymer type is less than about 10,000 kilodaltons. In some implementations, the molecular weight of the first polymer type is less than about 1,000,000 kilodaltons. In some implementations, a molecular weight $M_w$ of the first polymer type is between about 100,000 KDa and about 500,000 KDa. Polymer molecular weight can be determined by evaluating the viscosity of concentrated aqueous solution between approximately 15 and 20 weight percent solids content. For example, an aqueous copolymer solution of approximately 14 to 25 weight percent solids has a viscosity of 200 to 7500 centipoise at room temperature as measured on a Brookfield digital viscometer.

In some implementations, the liquid composition comprises between about 0.01 wt. % to about 50 wt. % of the first polymer type, such as about between about 0.1 wt. % to about 25 wt. %, between about 1 wt. % to about 20 wt. %, or between about 2 wt. % to about 15 wt. %.

In some implementations, the second polymer type (also referred to herein as "Type 2 polymer") is water soluble and contains at least two functional groups. Example functional groups of the second polymer type include OH, $NH_2$, Cl, Br, carboxylic, sulfonate, organic salt, and quaternary amines, each of which can optionally participate in crosslinking or other condensation reactions upon activation. Polymers of the second polymer type having a carbon backbone can contain esters, ether, amide, urethane, subunits in either linear, branch, or cyclic molecular configurations. In addition, the second polymer type can be a homopolymer, a copolymer, or a mixture thereof, sufficient to create an effective interpenetrating network. Furthermore, polymers of the second polymer type can be selected based on their physical properties such as viscosity, molecular weight, acid base properties such as pKa, ionic strength in aqueous solution, solubility in water, cloud point, or Kraft temperature. In addition, polymers can be selected based on their ability to create high osmotic pressure in aqueous systems. The second polymer type can comprise a plurality of polymers selected based on criteria above. Furthermore, polymers can be selected to specifically react with the first polymer type to impart unique physical properties and further be selected to prevent chemical reactive interaction with the first polymer type to create desirable hydrogel properties. The second polymer type can contain combinations of the aforementioned polymers. In some implementations, the second polymer type comprises polyethylene glycol polymers having a molecular weight from 150 to 10,000.

In some implementations, a second polymer type comprises one or more non-acrylate polymer. In some implementations, the non-acrylate polymer is a water-soluble polymer. In some implementations, the water-soluble polymer is polyethylene glycol. In some implementations, the non-acrylate polymer is nonionic. In some implementations, the non-acrylate polymer is linear, branched, cyclic or a combination thereof. In some implementations, the non-acrylate polymer includes one or more functional groups selected from OH, $NH_2$, Cl, Br, carbocyclic, sulfonate, esters, ethers, amides, urethane, quaternary amines, and organic salts.

In some implementations, the liquid composition comprises between about 0.01 wt. % to about 50 wt. % of the second polymer type, such as about between about 0.1 wt. % to about 25 wt. %, between about 1 wt. % to about 20 wt. %, or between about 5 wt. % to about 15 wt. %.

In some implementations, the ratio of the first polymer type to the second polymer type is about 1:0.75, about 1:1.5, or about 1:2.5 on a mass basis. In some implementations, a weight ratio of the first polymer type to the second polymer type is about 1:0.3, about 1:1, 1:1.5, or about 1:2.5. In some implementations, a weight ratio of the first polymer type to the second polymer type is in a range of about 1:1 to about 1:2. For example, a weight ratio of the first polymer type to the second polymer type is about 1:1, about 1.1:1, or about 1:2. In some implementations, a weight ratio of the first polymer type to the second polymer type is less than 2.5:1. In some implementations, an amount of the second polymer type is about equal to or greater than the first polymer type. In some implementations, an amount of the second polymer type is higher than the first polymer type.

Another aspect of the composition includes a crosslinking agent suitable to react with the first polymer type by thermal, UV, microwave, or other radiative, chemical, or photochemical means. Example crosslinking agents include, but are not limited to, thermally activated chemistries of polyepichorohydrin amines, quaternary amines, amides peroxides, peroxodisulfate, photoactive transition metal catalysts, brominate acrylates, polyaldehydes, polyhydroxy polymers, propenyl chemistries and the like. For example, like chemistries known to initiate polymerization via radiative energy, sonic energy, and/or thermal energy. In some implementations, the liquid composition comprises approximately 0.2 to 2 weight percent crosslinking agent using either a singular or plurality of chemistries. In some implementations, the liquid composition comprises between about 0.01 wt. % to about 10 wt. % of the crosslinking agent, such as about between about 0.2 wt. % to about 10 wt. %, between about 0.05 wt. % to about 5 wt. %, or between about 0.05 wt. % to about 0.5 wt. %. In some implementations, the crosslinking agent comprises up to 10 percent of the reactive polymer content. As used herein, "reactive polymer content" refers to the first polymer type, the second polymer type, and the crosslinking agent. In some implementations, the crosslinking agent is selected to optionally promote chemical interaction or chemically react with a coated substrate to impart improved coating adhesion properties of the thermal treated hydrogel coating. In some implementations, the chemical crosslinking agent is selected to react with the second polymer type.

In some implementations, the crosslinking agent is suitable for crosslinking the acrylate polymer of the first polymer type, the acrylate polymer of the first polymer type and with the non-acrylate polymer of the second polymer type, the first polymer type with the non-acrylate polymer of the second polymer type, or a combination thereof. In some implementations, the crosslinking agent is selected from a chemical crosslinker, a thermal crosslinker, or a photochemical crosslinker. In some implementations, the photochemical crosslinker is a UV crosslinker, a microwave crosslinker, or an ultrasonic crosslinker. In some implementations, the crosslinking agent is selected from polyepichorohydrin amines, quaternary amines, amides peroxides, peroxodisulfate, photoactive transition metal catalysts, brominate acrylates, polyaldehydes, polyhydroxy polymers, and propenyl compounds.

In some implementations, crosslinking of at least the first polymer type by at least one crosslinking agent is initiated by radiative means such as thermal activation, UV, microwave, or ultrasonic activation, or chemical reaction. In some implementations, the crosslinking is carried out by thermal activation above about 105° C. in air or a non-oxygen containing atmosphere.

The liquid compositions described herein can include water. In some implementations, water comprises at least 75 wt %. In some implementations, water comprises at least 80 wt %. In some implementations, water comprises at least 87 wt %.

Additional components can be added to the liquid composition to further improve or tailor the chemical and physical properties of the absorbent material (e.g., dry hydrogel coating). In some implementations, the composition further includes one or more additives. For example, fumed silica, aluminosilicate clays, carbon black, pigments, surfactants, plasticizers, adhesion promoters, yarn processing aids such oils, lubricants, silicones, sizing agents, biocides, and conducting and non-conducting particles or polymers. In some implementations, the liquid composition comprises a surfactant that acts as a surface-active agent, which can aid in the wetting of a hydrophobic surface of a substrate. In some implementations, the surfactant is polysorbate 80. In some implementations, the liquid composition comprises a biocide. In some implementations, the liquid composition comprises hydrated silica.

In some implementations, the liquid composition comprises conducting pigments or particulates. As such, particulates are capable of forming an electrically conductive percolating network within the absorbent material, the degree of water absorption or water ingress into a cable, for instance, can be determined by resistivity, conductivity, capacitance or other relevant measurements. For example, as the water swells the absorbent material, the continuous nature of the conducting percolating particle network is disrupted, leading to an increase or change in the resistive or conductive nature of the absorbent material. This can be useful in determining water ingress into a cable body or other applications where moisture intrusion is a nuisance. Sensors of this type have further applications to personal care and can be envisioned wherein a continuous hydrogel coated region, strip or fiber can be incorporated into a woven or non-woven material, such as diapers or incontinent pads for non-ambulatory patients, or pet care pads. The continuous hydrogel coated region, strip, or fiber can be connected to a removable, reusable powered electronic device capable of determining a change in conductivity, resistance, capacitance, or other relevant electrical property of the coated region and further capable of relaying information via Bluetooth or other means to signal exposure to water/urine. Furthermore, a water swell-able ink can be envisioned wherein a conductive carbon black, or other conductive polymers or components, can be incorporated into the liquid composition described herein. The liquid composition can be applied using various printing techniques such as, but not limited to, ink jet, screen printing, gravure, aerosolizing or other applications methods known in the art to create a conductive component that senses water exposure via resistivity, conductivity, or capacitance change from a dry non-swollen state. This can be useful for creating inexpensive sensors where moisture or water exposure is of concern.

In some implementations, the composition comprises organic or inorganic particulate material having an average diameter less than about 50 microns, wherein the particulate material comprises pigments, clays, metal oxides, conducting particles, non-conducting particles, or combinations thereof. It is understood that particulate dimensions can be described in terms of distribution sizes, surface area, and other relevant dimensionalities known in the art to define particulate matter less than 50 microns. In some implementations, the particulate material comprises conductive or non-conductive polymers.

In some implementations, the composition comprises conductive particulates sufficient to form a conductive absorbent material or coating with a measureable conductivity, resistivity, or capacitance. In some implementations, an attachable electronic interface is connected to the conductive absorbent material capable of measuring electrical properties of the material and communicating the status of the measured property to a user by either wireless or wired means. In some implementations, the conductive absorbent material is capable of absorbing an aqueous composition such that the measured electrical properties change proportionally to the quantity of aqueous composition absorbed.

In some implementations, the composition is applied to hygiene products such as diapers, incontinent pads, or other woven or non-woven disposable articles. In some implementations, determination and communication of soiled state of the hygiene products is carried out via the attachable electronic interface.

Not to be bound by theory, the interpenetrating network hydrogel can be created by polymers of the first type and the second type forming essentially independent co-mingled networks wherein the polymer networks can form either sequentially or simultaneously. More specifically, the first polymer type can form a network via thermal activation by a chemical crosslinking agent, while simultaneously the carrier water is evaporating. The second polymer type, which can have limited aqueous solubility, can form an aqueous polymer gel upon thermal processing as the water content continues to decrease. Upon further removal of residual formulation water and continued crosslinking of the first polymer type, interpenetration of the second polymer type can be achieved. In some implementations, the ratio of the first polymer type to the second polymer type is at least 1:0.5. As a result, an essentially water-free absorptive material can be formed that is capable of absorbing aqueous solutions many times its own weight. Optionally, the first polymer type may chemically interact with the second polymer type and furthermore, the second polymer type can self-interact effectively forming a gel network. In some implementations, the liquid composition comprises polymers of the second type that have sufficient functionality to create a higher molecular weight polymer via condensation type reactions upon sufficient heating. The second polymer type can form a scaffolding or a dimensional network wherein the second polymer type is entrained and comingled upon thermal activation at elevated temperatures.

In some implementations, the composition comprises a first polymer type comprising at least one acrylate copolymer, or acrylate polymer, or combinations thereof, and a second polymer type comprising at least one non-acrylate water soluble polymer, wherein the second polymer type comprises at least 25 weight percent of the total percent polymer content; and at least one crosslinking agent; wherein the composition is an aqueous composition comprising at least 75 weight percent water.

In some implementations, a solids content of the composition is at least 2 weight percent and less than 35 weight percent. In some implementations, the composition has a solid content in a range of about 20 wt. % solids to about 38 wt. % solids. In some implementations, the composition has about 20 wt. % solids. In some implementations, the composition has about 30 wt. % solids.

In some implementations, a viscosity of the composition is less than about 2500 centipoise (cP) at 23° C. In some implementations, a viscosity of the composition is less than about 1500 centipoise (cP) at 23° C. In some implementations, a viscosity of the composition is less than about 500 centipoise (cP) at 23° C. In some implementations, a viscosity of the composition is less than about 500 centipoise (cP) at 23° C. and the liquid composition has a total solids content equal to or less than about 25 wt. %. In some implementations, a viscosity of the composition is less than 500 centipoise (cP) at 23° C. with a total solids content of about 20 weight percent. In some implementations, a viscosity of the composition is equal to or less than about 200 centipoise (cP) at 23° C. and the total solids content is less than about 10 wt. %. As used herein, "total solids content" refers to the non-aqueous components in the formulation (i.e., a first polymer type, a second polymer type, and other non-water based ingredients).

In some implementations, a viscosity of the composition is no greater than 20% of an initial value within at least 3 months of an initial time. In some implementations, a viscosity of the composition is in a range of about 100 cP to about 700 cP at 23° C. In some implementations, a viscosity of the composition is about 125 cP. In some implementations, a viscosity of the composition is about 650 cP. In some implementations, a viscosity of the composition is less than about 250 centipoise (cP) at 23° C. In some implementations, a viscosity of the composition is less than about 100 centipoise (cP) at 23° C.

In some implementations, the composition is suitable to form an absorbent material (e.g. an absorbent coating or a superabsorbent polymer) upon crosslinking activation and subsequent water removal. In some implementations, thermal processing (i.e., exposure to an elevated temperature) is used to activate the crosslinking reaction and remove the water, which can activate polymerization of the acrylate co-polymers. In some implementations, the elevated temperature is in a range of about 60° C. to about 300° C., such as about 100° C. to about 225° C., or about 130° C. to about 195° C. In some implementations, the composition is suitable to form a coating that can accommodate thermal processing conditions in the range of about 130° C. to about 195° C.

In some implementations, the composition is suitable to provide an absorbent material having a water absorption capacity at least about 50 grams of water per gram of absorbent material. In some implementations, the absorbent material has a water absorption capacity of at least about 100 g water per gram of absorbent material. In some implementations, the absorbent material has a water absorption capacity of at least about 200 g water per gram of absorbent material. In some implementations, the absorbent material has a water absorption capacity of at least 300 g water per gram of absorbent material. In some implementations, the absorbent material has a water absorption capacity of at least about 450 g water per gram of absorbent material. In some implementations, the absorbent material has a water absorption capacity of at least about 500 g water per gram of absorbent material. In some implementations, the absorbent material has a water absorption capacity of at least about 600 g water per gram of absorbent material.

In some implementations, the absorbent material is capable of absorbing at least 80 percent of the total water absorption capacity within 30 seconds exposure to water. As used herein, "total water absorption capacity" refers to the quantity of absorbed water in terms of g/g after prolonged exposure in water (i.e., the time period at which the absorbed quantity of water essentially ceases to increase) and represents the maximum absorbable quantity of water for a given absorbent material. In some implementations, the absorbent material is capable of absorbing at least 90 percent of the total water absorption capacity within 30 seconds exposure to water.

In some implementations, the absorbent material (i.e., cured coating) has a water content less than about 30 weight percent, less than about 15 weight percent, or less than about 10 weight percent.

In some implementations, the liquid composition is applied to a substrate. In some implementations, the liquid composition is crosslinked and applied to the substrate simultaneously. In some implementations, the liquid composition is coated onto the substrate. In some implementations, the composition is capable of being applied to flexible or non-flexible substrate using ink jet, screen-printing, or gravure printing and subsequently activated to form an absorbent coating.

In some implementations, the composition is applied to woven or non-woven substrates and subsequently activated to form an absorbent coating. In some implementations, the woven substrate is a polyester yarn or an aramid yarn. In some implementations, the nonwoven substrate is a polyester nonwoven or a cellulosic nonwoven. In some implementations, the composition is applied to fibers, pulp, or other finely divided filler substrates and subsequently activated to form an absorbent coating. In some implementations, the composition is applied to a substrate by dip coating, roll coating, printing, spray coating, or other liquid transfer methods. In some implementations, the absorption profile of the coating can be modulated by how the liquid composition is applied. In some implementations, the liquid composition is coated onto the substrate using dip coating or roll coating.

In some implementations, the liquid composition is printed onto the substrate. In some implementations, the liquid composition is printed onto the substrate using an ink jet printer or a print screen.

In some implementations, the liquid composition is aerosolized. In some implementations, the aerosolized liquid composition has a median drop size of less than about 500 microns.

In some implementations, the substrate is a non-absorptive material. In some implementations, applying the composition to a non-absorptive material to form an absorbent coating on the substrate imparts absorptive properties to a non-absorptive substrate material. In some implementations, the absorbent coating swells when exposed to water and forms a gel on the substrate.

In some implementations, the composition is applied uniformly on a surface of the substrate. In some implementations, the composition is applied to a substrate to form a uniform, continuous coating. As used herein, "continuous coating" refers to a coating that is essentially non-segmented and does not have discrete areas or regions of non-coated substrate. In some implementations, the uniform, continuous coating is applied at 1 to 200 wt. %, 1 to 100 wt. %, 12 to 30 wt. %, 12 to 16 wt. %, or 20 to 30 wt. %, wherein wt. % refers to wt. % of the total weight of the coated substrate.

In some implementations, the composition is applied to a substrate to form a uniform, non-continuous coating. As used herein, "non-continuous coating" refers to a coating that has discrete coated and uncoated regions of the substrate. the In some implementations, the uniform, non-continuous coating is applied to a substrate at 1 to 10 wt. %, such as 1 to 4 wt. % or 8 to 10 wt. %, wherein wt. % refers to wt. % of the total weight of the coated substrate.

In some implementations, the composition is applied non-uniformly on a surface of the substrate. In some implementations, the composition is applied to a partial region of a substrate or in a pattern on the substrate. In some implementations, the liquid composition is coated onto the substrate as a pattern. In some implementations, the pattern comprises uniform or uniform dithered patterns, stripes, geometric shapes, logos, lettering, numbers, images, other arrangements, combinations thereof, or other patterns known in the art of printing to create discrete function regions of a coated substrate. In some implementations, applying the composition in a particular zone, region, or pattern on the substrate, provides absorbent properties to a portion of a surface of a substrate, while allowing other regions of the surface of the substrate to remain non-absorbent.

In some implementations, the substrate comprises a woven material. In some implementations, the woven material comprises aramid yarn or polyester yarn.

In some implementations, the substrate comprises a non-woven material. In some implementations, the non-woven material comprises Spunbound, Spunlace, Airlaid, Drylaid, or Wetlaid, at any basis weight. In some implementations, the non-woven material comprises polypropylene. In some implementations, the composition is suitable to provide good adhesion to a non-woven substrate. For example, there is no flaking or dusting on the surface of the substrate.

In some implementations, the composition is applied to one surface of the substrate. In some implementations, the composition is applied to two or more surfaces of a substrate.

In some implementations, the composition comprises an emulsion, suspension, or multiphase liquids mixture.

In some implementations, the composition comprises rheology modifiers, surface tension modifiers, or combinations thereof. In some implementations, the absorbent material is conductive.

In some implementations, the absorbent material is flexible. For example, the absorbent material does not delaminate upon flexure. In some implementations, the absorbent material does not flake and/or is not friable when the coated substrate, such as a coated yarn, is bent or drawn over a stationary smooth rod with a set pressure.

In some implementations, the composition is free of formaldehyde. In some implementations, the composition is free of volatile organic chemicals (VOCs). In some implementations, the composition is free of halogenated compounds. In some implementations, the composition is non-toxic.

Also provided herein is a method of forming an absorbent material (e.g., a superabsorbent polymer) comprising providing a liquid composition comprising a first polymer type comprising one or more acrylate polymer, a second polymer type comprising one or more non-acrylate polymer, a crosslinking agent, and water; and activating the liquid composition to form the absorbent material.

In some implementations, activating the liquid composition comprises crosslinking the liquid composition and removing the water to reduce the water content. In some implementations, activating the liquid composition comprises thermally activating the liquid composition at a temperature of at least about 100° C. (i.e., heating the liquid composition to a temperature of at least about 100° C.). In some implementations, the thermal activation initiates the crosslinking reaction and removes the water to reduce the water content.

In some implementations, activating the liquid composition is performed in an air atmosphere. In some implementations, activating the liquid composition is performed in a non-oxygen containing atmosphere.

In some implementations, activating the liquid composition comprises crosslinking the liquid composition and removing the water to achieve a water content of less than about 10 wt. %. In some implementations, removing the water comprises thermally activating the liquid composition at about 105° C. In some implementations, crosslinking the liquid composition comprises crosslinking the liquid composition thermally, chemically, or photochemically.

In some implementations, the method further includes aerosolizing the liquid composition to form an aerosolized liquid composition. In some embodiments, the method further includes spray drying the aerosolized liquid composition onto a substrate. In some implementations, spray drying the aerosolized liquid composition onto the substrate and activating the liquid composition to form the absorbent material is performed simultaneously.

In some implementations, the method further includes applying the liquid composition to a substrate. In some implementations, applying the liquid composition to the substrate comprises applying the liquid composition as a uniform coating. In some implementations, applying the liquid composition to the substrate comprises applying the liquid composition as a non-uniform coating. In some implementations, applying the liquid composition as a non-uniform coating comprises applying the liquid composition in a pattern. In some implementations, wherein applying the liquid composition to a substrate comprises co-extruding the liquid composition with the substrate. In some implementations, applying the liquid composition to a substrate comprises coating the liquid composition onto the substrate. In some implementations, applying the liquid composition onto the substrate comprises dip coating the liquid composition onto the substrate. In some implementations, applying the liquid composition onto the substrate comprises roll coating the liquid composition onto the substrate.

In some implementations, applying the liquid composition to a substrate comprises printing the liquid composition onto the substrate. In some implementations, printing the liquid composition onto the substrate comprises screen printing the liquid composition onto the substrate. In some implementations, printing the liquid composition onto the substrate comprises gravure printing the liquid composition onto the substrate. In some implementations, printing the liquid composition onto the substrate comprises printing the liquid composition onto the substrate with an ink jet printer.

In some implementations, applying the liquid composition to the substrate comprises applying the liquid composition to a fiber, a pulp or a finely divided substrate. In some implementations, applying the liquid composition to the fiber comprises applying the liquid composition to a yarn. In some implementations, applying the liquid composition to the yarn comprises applying the liquid composition to an aramid yarn.

In some implementations, the method further includes pre-coating the substrate before applying the liquid composition to the substrate. In some implementations, precoating the substrate comprises precoating the substrate with polyurethane.

In some implementations, applying the liquid composition to the substrate and activating the liquid composition to form the absorbent material (e.g., superabsorbent polymer) is performed simultaneously.

In some implementations, the method further includes incorporating the absorbent material into a product. In some implementations, the product is a hygiene product. In some implementations, the hygiene product is diapers. In some implementations, the product is a woven article.

In some implementations, the absorbent material is incorporated into the product as a sensor. In some implementations, the method further includes sensing a change in conductance, resistance or capacitance with the sensor. In some implementations, the method further includes communicating the change to a user.

In some implementations, the method includes providing a liquid composition, applying the liquid composition to a substrate, and activating the liquid composition to form an absorbent material (e.g., a superabsorbent polymer).

Also provided herein is a method comprising providing a liquid composition having a viscosity less than about 2500 centipoise, less than 1500 centipoise, or less than 500 centipoise at 23° C. and up to about 25 wt. % of solids, and activating the liquid composition to form an absorbent material.

Also provided herein is an aqueous composition comprising soluble nitrogen-based chemistries that promote hydrogel formation and which can be used as a substrate pretreatment prior to treatment with a liquid composition described herein on the same substrate. In some implementations, the soluble nitrogen-based chemistry comprises ammonium hydroxide, ammonium zirconium carbonate, ammonium chloride, quaternary ammonium compounds, nitrates, nitrides, nitrogen containing fictional groups including alkylnitrates, alkyl nitrides nitro alkanes, alkyl amines, urethanes, amides, polyamide polyols amines, amino acids, and amino silanes. In some implementations, the aqueous composition comprises an adhesion promoter.

Also provided herein is an absorbent material (e.g., a superabsorbent polymer) formed by crosslinking the liquid composition disclosed herein.

Also provided herein is a coated substrate prepared according to the methods described herein.

Also provided herein is a substrate coated with an absorbent material disclosed herein. In some implementations, the absorbent material comprises a first polymer type comprising one or more acrylate polymer, and a second polymer type comprising one or more non-acrylate polymer. In some implementations, the substrate is a fiber. In some implementations, the absorbent material has a water absorption capacity of at least 200 grams of water per gram of absorbent material and a water absorption rate of at least 80% of the water absorption capacity within 30 seconds of exposure to water. In some implementations, the fiber is a synthetic fiber. In some implementations, the fiber is a natural fiber. In some implementations, the fiber is a yarn. In some implementations, the fiber is incorporated into a woven textile. In some implementations, the fiber is incorporated into a non-woven textile.

Also provided herein is a method of forming a coated substrate comprising providing a liquid composition comprising: i) a first polymer type comprising one or more acrylate polymer, ii) a second polymer type comprising one or more non-acrylate polymer, iii) a crosslinking agent, wherein the crosslinking agent is suitable for crosslinking the acrylate polymer of the first polymer type, the acrylate polymer of the first polymer type with the non-acrylate polymer of the second polymer type, the non-acrylate polymer of the second polymer type, or a combination thereof, and iv) water; applying the liquid composition to a substrate; and activating the liquid composition to form an absorbent coating on the substrate.

In some implementations, liquid compositions disclosed herein comprise about 0 to 10 weight percent polymers of the second type. Formulations are envisioned within the scope of the invention wherein the viscosity, wetting properties, wicking rates, surface tension, weight percent solids of polymers of the first and second type, and other physical chemical properties can be altered of the liquid composition to ether improve or impede absorption into porous materials. In addition, methods of processing can be further envisioned wherein the crosslinking activation of the liquid formulation can essentially happen simultaneously upon liquid application, effectively mitigating undesirable performance properties and increasing the speed of water absorption.

It can be envisioned that the composition described herein can be, but not limited to spray dried to make granular material, cast to make sheets, strips, flakes, or chips, extruded, pelletized, or used as a functional binder, and spun into fibers. Optionally polymer chemistries can be selected to create coatings that absorb under high ionic strength such as saline.

As used herein, and unless otherwise specified, the term "about," when used in connection with a numeric value or range of values is to indicate that the value or range of values may deviate to an extent deemed reasonable to one of ordinary skill in the art. In general, the term "about" is used herein to modify a numerical value above and below the stated value by a variance of 10% unless otherwise specified. It is well known that instrument variation and other factors can affect the numerical values. The term "about" is to accommodate these variations.

EXAMPLES

Example 1: Liquid Compositions

Formation of the interpenetrating network hydrogel coatings on yarns, fibers, and other surfaces can be achieved using the following non-limiting formulation examples.

Composition 1

A formulation containing 78.4 percent water wherein an acrylate co-polymer with a viscosity of about 1000 centipoise in a 20 weight percent aqueous solution was incorporated at 8.0 weight percent. Polyethylene glycol, 200 molecular weight, was added to the aqueous acrylate copolymer solution at 13.3 weight percent. Lastly, a polyepichorohydrin amine initiator was incorporated at 0.24 weight percent under sufficient mixing conditions. Biocides were optionally added at 0.1 to 0.15 weight percent of the total composition. Total solids were essentially about 21.54 weight percent of the final composition.

Composition 2

A formulation containing 82.1 percent water wherein an acrylate co-polymer with a viscosity of about 1000 centipoise in a 20 weight percent aqueous solution was incorporated at 6.7 weight percent. Polyethylene glycol, 200 molecular weight, was added to the aqueous acrylate copolymer solution at 11 weight percent. Lastly, a polyepichorohydrin amine initiator was incorporated at 0.2 weight percent under sufficient mixing conditions to achieve a uniform composition. Biocides were optionally added at 0.1 to 0.15 weight percent of the total composition. Total solids were essentially about 17.5 weight percent of the final composition.

Composition 3

A formulation containing 89.2 percent water wherein an acrylate co-polymer with a viscosity of about 1000 centipoise in a 20 weight percent aqueous solution was incorporated at 6.7 weight percent. Polyethylene glycol, 200 molecular weight, was added to the aqueous acrylate copolymer solution at 6.7 weight percent. Lastly, a polyepichorohydrin amine initiator was incorporated at 0.12 weight percent under sufficient mixing conditions to achieve a uniform composition. Biocides were optionally added at 0.1 to 0.15 weight percent of the total composition. Total solids were essentially about 10.78 weight percent of the final composition.

Composition 4

A formulation containing 80.1 percent water wherein an acrylate co-polymer with a viscosity of about 1000 centipoise in a 20 weight percent aqueous solution was incorporated at 6.7 weight percent. Polyethylene glycol, 200 molecular weight, and polyethylene glycol, 400 molecular weight, was added to the aqueous acrylate copolymer solution at 11 weight percent and 2 weight percent, respectively. Lastly, a polyepichorohydrin amine initiator was incorporated at 0.2 weight percent under sufficient mixing conditions to achieve a uniform composition. Biocides were optionally added at 0.1 to 0.15 weight percent of the total composition. Total solids were essentially about 19.5 weight percent of the final composition.

Composition 5

A formulation containing 80.0 percent water wherein an acrylate co-polymer with a viscosity of about 1000 centipoise in a 20 weight percent aqueous solution was incorporated at 6.7 weight percent. Polyethylene glycol, 200 molecular weight, and polyethylene glycol, 400 molecular weight, was added to the aqueous acrylate copolymer solution at 6.55 weight percent and 6.55 weight percent respectively. Lastly, a polyepichorohydrin amine initiator was incorporated at 0.2 weight percent under sufficient mixing conditions to achieve a uniform composition. Biocides were optionally added at 0.1 to 0.15 weight percent of the total composition. Total solids were essentially about 19.5 weight percent of the final composition.

Composition 6

A formulation containing 82.1 percent water wherein an acrylate co-polymer with a viscosity of approximately 2500 centipoise in a 14 weight percent aqueous solution was incorporated at 4.7 weight percent. Polyethylene glycol, 200 molecular weight, was added to the aqueous acrylate copolymer solution at 8 weight percent. Lastly, a polyepichorohydrin amine initiator was incorporated at 0.15 weight percent under sufficient mixing conditions to achieve a uniform composition. Biocides were optionally added at 0.1 to 0.15 weight percent of the total composition. Total solids were essentially about 12.85 weight percent of the final composition.

Composition 7

A formulation containing about 80 g of water, 10.6 g acrylate co-polymer, 9.3 g PEG 200, 0.114 g polyepichorohydrin amine (0.95 at 12% solution) and optional trace biocide. The composition had about 20 weight percent total solids.

Composition 8

A formulation containing about 80 wt. % water, 10.6 wt. % acrylate copolymer, 9.3 wt. % PEG 200, 0.114 wt. % polyepichorohydrin amine, and 0.03% Polysorbate 80.

Composition 9

A formulation containing about 80% water, about 11% acrylate copolymer, about 10% PEG200, and about 0.073% polyepichorohydrin amine. The composition had a total solids content of about 21 wt. %. The acrylate copolymer was a sodium salt copolymer Formula 1 having the following molecular weight values: $M_w$ 500,000 Daltons, $M_z$ 910,000 Daltons, and $M_p$ 520,000 Daltons. The composition had a viscosity in the range of about 1000 to 2000 cP.

Composition 10

A formulation containing about 80% water, about 11% acrylate copolymer, about 10% PEG200, and about 0.12% polyepichorohydrin amine. The composition had a total solids content of about 21 wt. %. The acrylate copolymer was a sodium salt copolymer Formula 1 having the following molecular weight values: $M_w$ 215,000 Daltons, $M_z$ 340,000 Daltons, and $M_p$ 225,000 Daltons. The composition had a viscosity in the range of about 1000 to 2000 cP. The composition optionally included about 1% hydrated silica.

Composition 11

A formulation including about 63.8% water, about 16% acrylate copolymer, about 20% PEG 200, and about 0.2% polyepichorohydrin amine initiator.

For each Composition 1-11, total solids content can be adjusted by reducing the water content of the formulation or with the addition of other additives. For example, the total solids content can be up to 60 wt. %.

Example 2: Evaluation of Water Absorption Properties on Woven Substrates

The liquid formulations described in Example 1 were evaluated for their water absorption properties. Liquid formulations were placed in a container equipped with an eyelet fixture and a squeegee plate wherein a 1111 Dtex polyester or aramid yarn filament was threaded. The yarn was pulled through liquid formations to effectively coat fibers with the desired weight of liquid formulation. Subsequently, the coated yarn was wrapped on a holder suitable for thermal processing in an oven set at 120 to 190 Celsius for a predetermined amount of time. Water absorption evaluations were done in the following manner: A 1 meter coated and thermally treated yarn was weighed using an appropriate balance to determine the coating weight. The coated yarn was submerged in deionized water for set period of time. Once the soak time was completed, the yarn was removed and allowed to drip for 1 minute and subsequently weighed to determine the amount of water absorbed during exposure to the water. Coated yarns were found to have a high degree of flexibility and lack stiffness associated with acrylate coatings described in prior art. The improved mechanical properties are particularly desirable and suitable for incorporating the coated yarns into cables, fiber optics, or other industrial applications by alleviating dusting or flaking issues during manufacturing.

Liquid compositions described herein were applied to 1111 Dtex aramid resulting in essentially 10 weight percent dry coating after thermally processing at 170° C. for 4 minutes. The liquid compositions contained varying ratio of first polymer type and second polymer type such that the total solids content was approximately 17.5 weight percent. The ratio of polymer types were adjusted to reflect the values shown in the graph and the initiator quantity was held constant with regard to the amount of polymer type 1 (acrylate polymer) as used in Composition 6 of Example 1. For example, the range of compositions included, but not limited to, approximately 0.5 to 5 ratios of the first polymer type to the second polymer type (or Type 1 and Type 2 polymer, respectively). Water absorption properties were determined by immersing 1 meter long samples for 1 minute in Deionized water and subsequently allowed to drip one minute prior to weight determination.

Figure 1A:
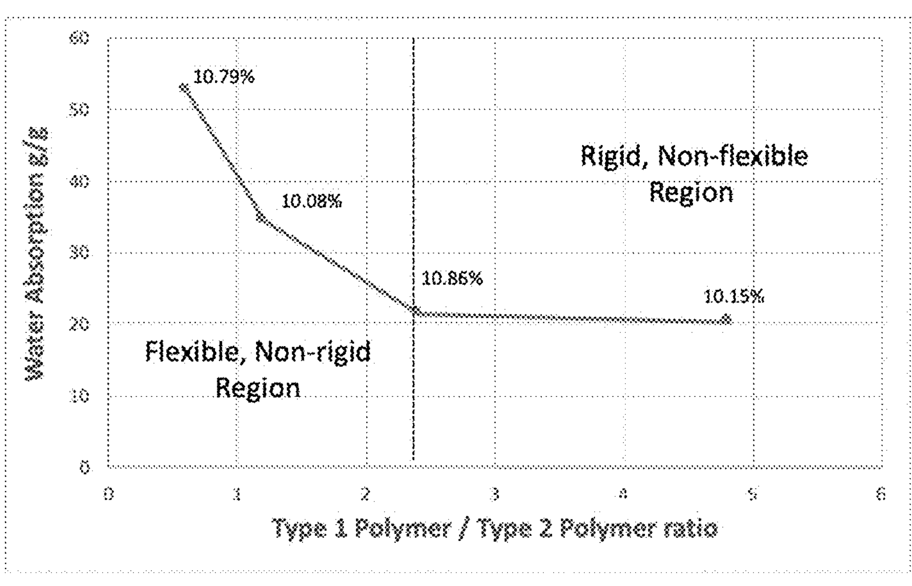
FIG. 1A is a graph showing the impact of the Type 1 polymer to Type 2 polymer weight ratio in the composition on the absorption characteristics and mechanical flexibility of approximately 10 weight percent thermally processed coatings on aramid yarn (1111Dtex).
Figure 1B:
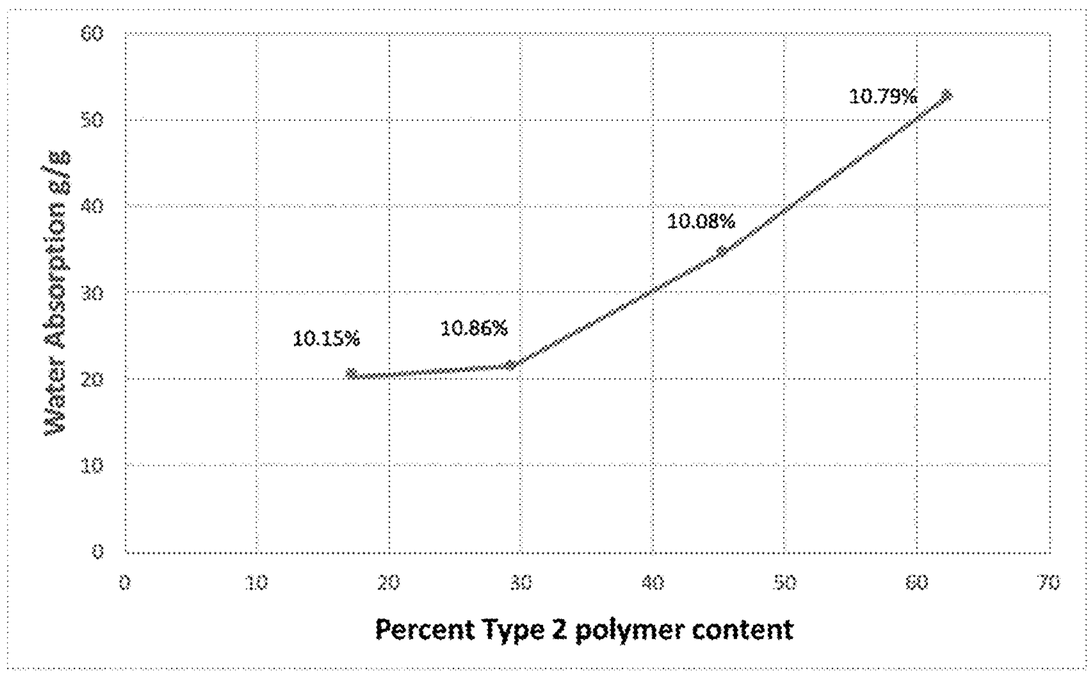
FIG. 1B is a graph showing water absorption vs. percent of Type 2 polymer in the composition.

FIG. 1A shows a graph of water absorption of the coated yarn vs. the ratio of Type 1 polymer to Type 2 polymer, with the weight percent of each processed coating on aramid yarn (1111Dtex) shown above each point on the graph (approx. 10 wt. %). This graph illustrates the unexpected benefit of compositions having a Type 1 polymer to Type 2 polymer weight ratio less than approximately 2.5:1, wherein the coatings exhibited exceptional water absorption and flexibility with good coating adhesion, as shown by the Flexible, non-rigid region of the graph. The "Flexible, non-rigid" region of FIG. 1A refers to not flaking or friable when the coated yarn is bent or drawn over a stationary smooth rod with a set pressure (see Example 11). Furthermore, FIG. 1B illustrates the water absorption of the coated yarn vs. the weight percent of the second polymer type in the compositions described herein; wherein weight percent of the second polymer type refers to the weight percent of the total polymer composition (e.g., Type 2 polymer/(Type 1 polymer+Type 2 polymer)). Compositions having greater than about 30% content of the second polymer type have unexpected absorption properties, both speed and weight magnitude, and superior flexibility compared with compositions having less than 30 weight percent of the second polymer type. Speed was determined by time to reach maximum swell capacity. Flexibility was determined by whether the yarn retains its uncoated flexible characteristics and is not mechanically rigid.

Figure 2:
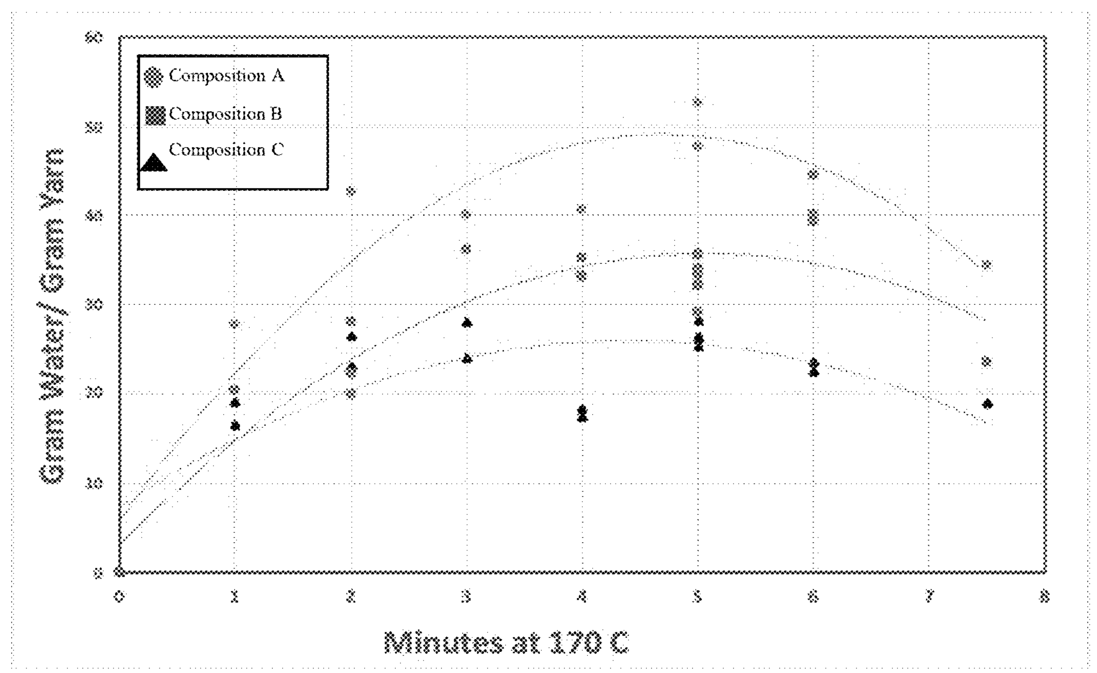
FIG. 2 is a graph showing water absorption for liquid compositions coated on polyester yarn (1111Dtex) and thermally treated at 170° C. for various times in air. Composition A=13.2 wt. % coating, Composition B=11.5 wt. % coating, Composition C=6.8 wt. % coating.

FIG. 2 illustrates the impact of heating time at about 170° C. from 1 to 7.5 minutes on water absorption for liquid compositions disclosed herein coated on polyester yarn (1111Dtex) at three different coating levels: Composition A=13.2 weight percent coating, Composition B=11.5 weight percent coating, and Composition C=6.8 weight percent coating; wherein weight percent coating refers to the percent of the coating on the yarn (weight coating/(weight coating+yarn)) determined post thermal processing. Each Composition A, B, and C had a type 1 polymer (acrylate) to type 2 polymer (PEG) ratio at about 0.6; however, the overall solids content was adjusted by dilution to achieve the target coating levels of about 13.2, 11.5 and 6.8 weight percent coating, respectively, as evident from post thermal processing. The data indicate that essentially all formulations and thermal processing conditions give rise to at least 20 gram of water absorption per gram of yarn, which is generally accepted as an industry standard. Furthermore, coated polyester yarns are capable of absorbing up to about 50 grams of water per gram of yarn, surpassing the minimum standard by a factor of about 2.5. The data also illustrates that a flexible coating with good adhesion can be formed on yarns, even at low coating levels such as about 6 wt. %. The absorption capacity of the coating for each composition ranged from about 380 to 425 g/g. In addition, the data indicate that both coating level and processing condition can be adjusted independently to achieve the desired absorption characteristics of yarns treated with the liquid compositions disclosed herein.

Figure 3:
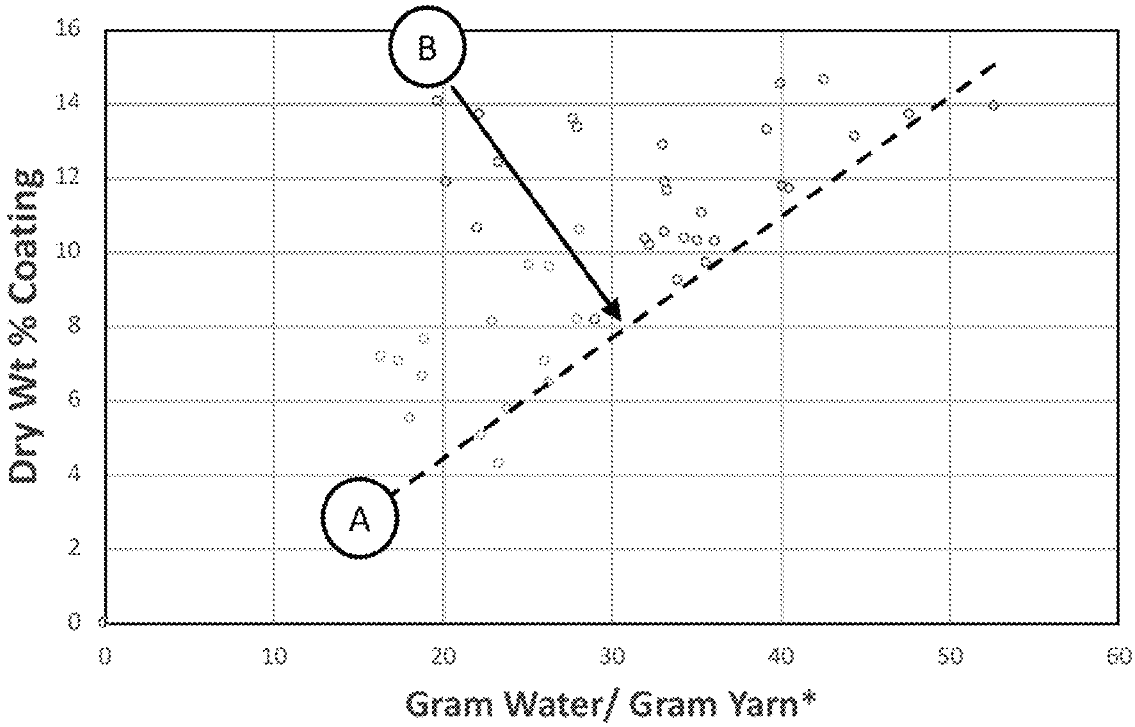
FIG. 3 is a graph illustrating water uptake in terms of gram water per gram yarn for various compositions as a function of dry weight coating on polyester yarn (1111Dtex) produced under various thermal process conditions. Line A illustrates the maximum relationship between dry weight coating on polyester yarn and associated water absorption. Line B illustrates the impact of process conditions on achieving maximum water absorption per coating weight.

FIG. 3 illustrates the relationship between the dry coating level of the hydrogel polymer and the water absorption characteristics for samples processed under various thermal conditions on 1111 Dtex polyester yarn, wherein dry coating level refers to the percent of the coating on the yarn (wt coating/(weight coating+yarn)) determined post processing. For a coated yarn, the absorption of the coating can be determined to assess the efficiency or specific capacity of the coating. The water absorption of the coating can be determined by: (yarn's post thermal process weight−yarn weight)=coating weight; water absorption is yarn weight after soaking in water-coated yarn weight=amount of absorbed water; coating absorption=amount of water/coating weight; wherein all units are in g/g. In essence, the absorption is normalized on a coating weight basis vs. the coated yarn weight basis. Line A represents the achievable, but not limited to, absorption capacity of a coating (e.g., a hydrogel coating) on 1111 Dtex polyester of about 350 to 375 gram water per gram coating. Line A illustrates that high levels of absorption are possible independent of coating level, meaning the reaction kinetics are favorable and are not impeded by coating level. Furthermore, the mechanical properties of the coatings, such as dry coating strength, resistance to flaking or dusting can be controlled as a function of thermal processing conditions. Line B qualitatively represents the relationship between the mechanical properties (e.g., coating durability) of dry hydrogel coatings on polyester yarns and the residual water content essentially associated with the coating as a result of various processing conditions. As line B approaches line A, the water content of the hydrogel coating approaches 0 to 15 weight percent. As such, the mechanical properties of the hydrogel coatings and their water absorption characteristics can be varied independently. Without wishing to be bound by theory, it is believed that residual water in the dry hydrogel coating acts as a plasticizer in the interpenetrating hydrogel networks that imparts desirable physical properties. FIG. 3 also illustrates that a non-monotonic relationship exists between absorption characteristics and thermal processing due to the nature of the polymerization process. Not to be bound by theory, in some implementations thermal exposure of the coatings is limited such that the maximum absorption is achieved to avoid undesirable degradation of the coating. At or below the maximum absorption capacity of the coating, desirable mechanical properties were also achieved.

Figure 4:
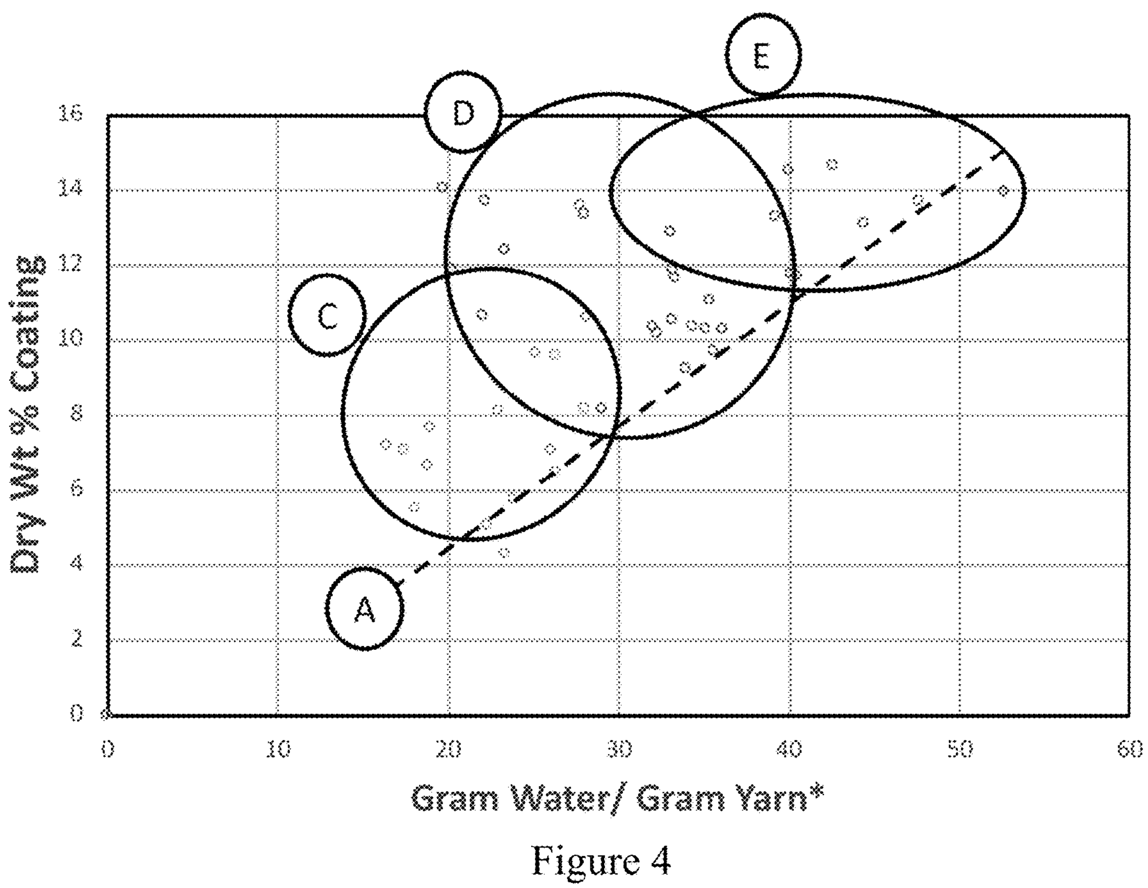
FIG. 4 is a graph showing Composition 1 (E), Composition 2 (D), and Composition 3 (C) of Example 1, illustrating the ability to tailor the water absorption of coated polyester yarn (Dtex1111) using a fixed application method.

FIG. 4 illustrates the water absorption performance of the formulations of Compositions 1, 2, and 3 of Example 1 and designated at region E, D, and C respectively on 1111Dtex polyester yarn. The data points within each region represent different thermal processing conditions. Data indicate that formulations can accommodate a broad range of absorption performance. For example, region E, corresponding to the formulation of Composition 1, has an absorption range from approximately 40 to 55 gram water per gram yarn at approximately 11 to 14 weight percent dry hydrogel coating wherein the formulation contains approximately 21.5 weight percent solids; wherein weight percent dry hydrogel coating refers to the percent of the coating on the yarn (weight coating/(weight coating+yarn)) determined post processing, and may also be referred to herein as "coating level." Region D, corresponding to the formulation of Composition 2, has an absorption range from approximately 30 to 40 gram water per gram yarn at approximately 8 to 12 percent dry hydrogel coating wherein the formulation contains approximately 17.5 weight percent solids. Lastly, region C, corresponding to the formulation of Composition 3, has an absorption range from approximately 18 to 28 gram water per gram yarn wherein the formulation contains approximately 11 weight percent solids. As shown in FIG. 4, liquid compositions disclosed herein can be made to create a broad range of coating levels that have very high water absorption. For example, coating level of 6-8 wt. % achieving a 20 to 30 g/g yarn absorption on a water blocking yarn.

Figure 5:
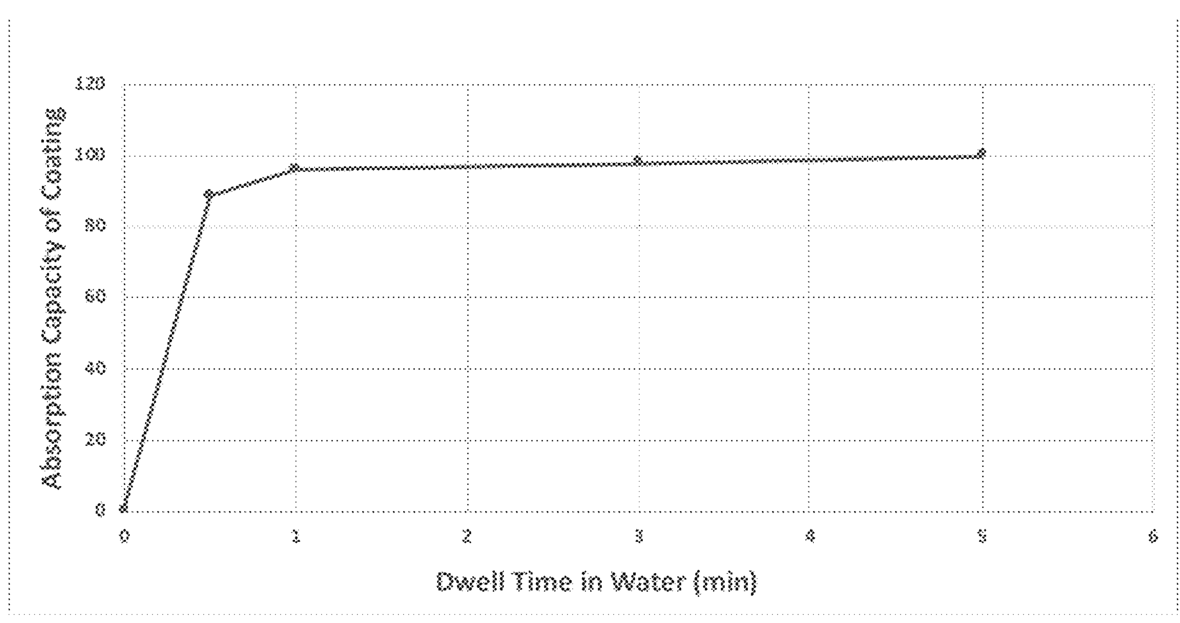
FIG. 5 is a graph showing water absorption capacity (%) of about 10 weight percent coating (relative to the weight of the yarn) of the superabsorbent hydrogel on polyester yarn (Dtex1111) as a function of dwell time in deionized water and one minute post drip prior to weight measurement.

With respect to the rate of water absorption, FIG. 5 illustrates the rapid swelling characteristics of an example coating formed from an example liquid composition on polyester. The coating level was approximately 10 weight percent and the coating was formed at 170° C. for 4 minutes. The yarn was placed in deionized water and the absorbed weight was measured at different time periods (30 seconds, 1 minute, 3 minutes, and 5 minutes). All of the absorption values were normalized to the 5 minute time point which was determined to have the maximum absorption value. The y-axis shows absorption capacity of the coating in terms of %. This data illustrates the speed of absorption, which is an important metric for water blocking yarns. A particular desirable feature of the absorbent coatings disclosed herein is the speed at which the hydrogel coatings absorb water. As shown in FIG. 5, approximately 90% of the absorption capacity was reached within 30 seconds of immersion, and nearly 100% of the absorption capacity was reached within about 1 minute of exposure to deionized water. This can be particularly useful in wire and cable applications where the rapid swelling can stop the further ingress of water into the cable body. Without wishing to be bound by theory, the unique rapid absorption rate is associated with the high efficiency of the dry interpenetrating hydrogel coating which does not "gel block" up immersion in water and the high osmotic pressure established by the second polymer type.

Figure 6A:
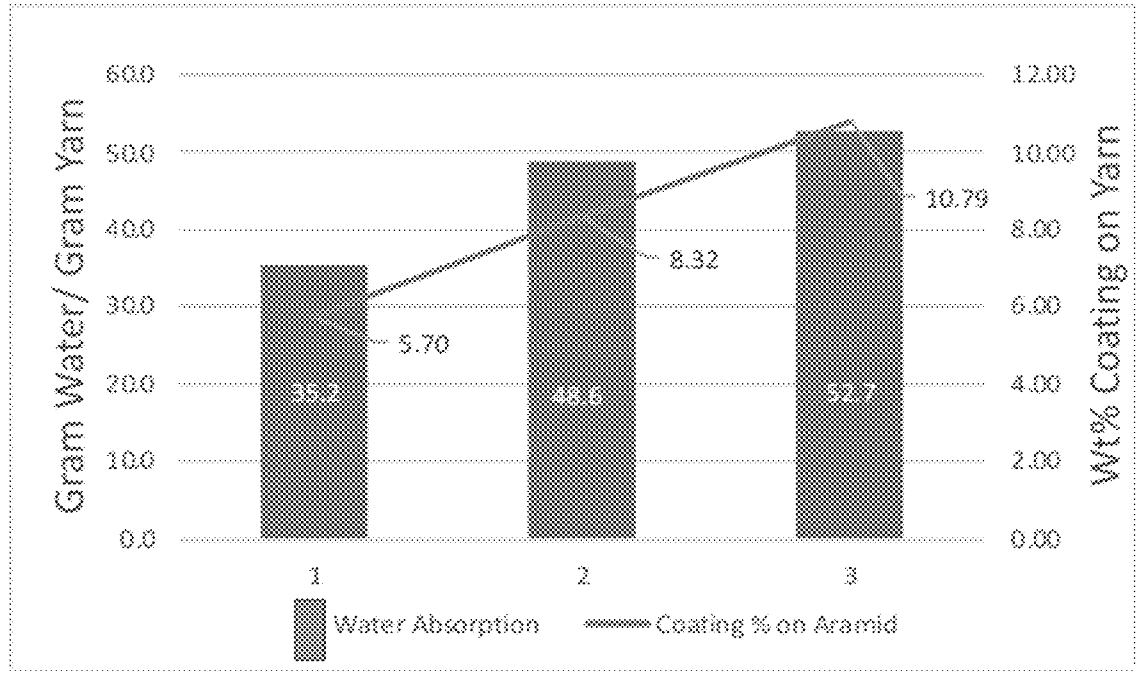
FIG. 6A is a graph showing water absorption of hydrogel coatings on aramid yarns (Dtex1111) over the range of approximately 5 wt. % to 11 wt. % coatings.
Figure 6B:
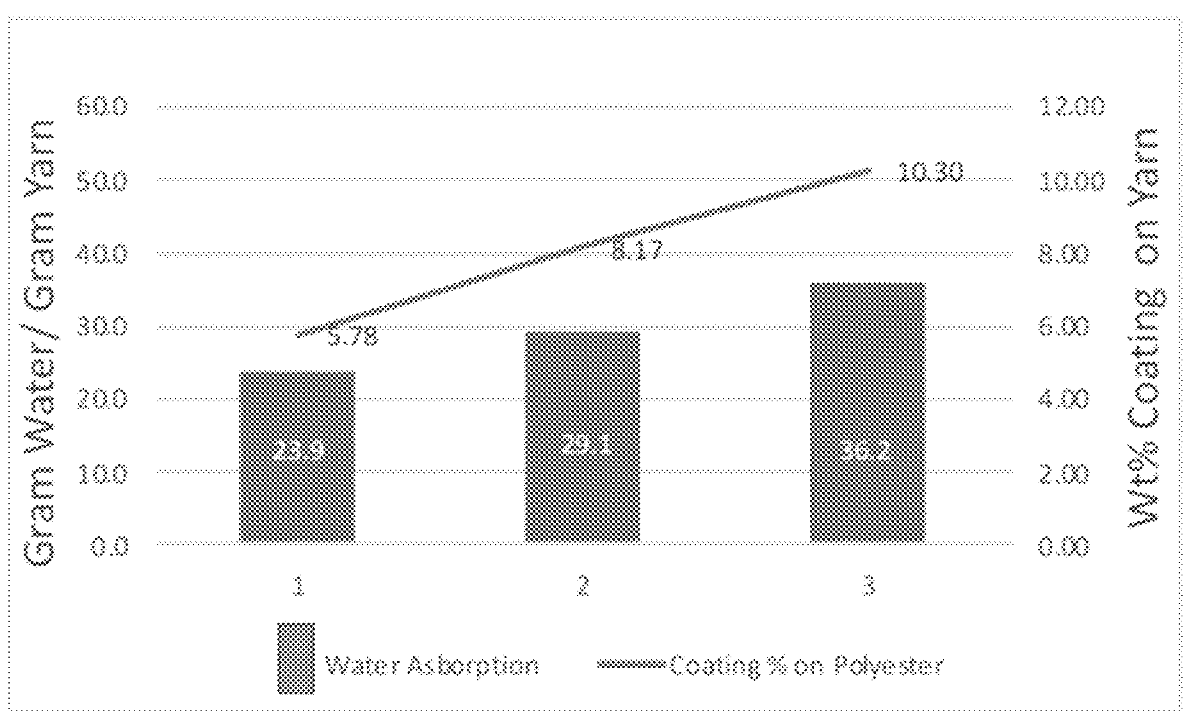
FIG. 6B is a graph showing water absorption of hydrogel coatings on polyester yarns (Dtex1111) over the range of approximately 5 wt. % to 11 wt. % coatings.

Liquid compositions disclosed herein can have particular synergy with nitrogen based polymer chemistry such as, but not limited to, polyamides (nylon, aramid) and polyurethanes. For example, FIGS. 6A and 6B illustrate the difference between water absorption performance from 1111Dtex polyester (FIG. 6B) and 1111 Dtex aramid yarns (FIG. 6A) with similar 5 to 11 weight percent coatings using Composition 2 of Example 1 and exposed to water as previously described, wherein weight percent coating refers to the percent of the coating on the yarn (weight coating/(weight coating+yarn)) determined post thermal processing. A 10.8 weight percent coating on aramid resulted in about 52 gram water per gram yarn and a 10.3 weight percent coating on polyester resulted in about 36.2 gram water per gram yarn. A 8.3 weight percent coating on aramid resulted in about 48.6 gram water per gram yarn and a 8.2 weight percent coating on polyester resulted in about 29.1 gram water per gram yarn. A 5.7 weight percent coating on aramid resulted in about 35.2 gram water per gram yarn and a 5.8 weight percent coating on polyester resulted in about 23.9 gram water per gram yarn.

Unexpectedly, the mass of water absorbed on aramid is approximately 150 to 160 percent greater than on polyester at a similar dry hydrogel coating weight demonstrating a particularly beneficial efficiency on yarns composed of nitrogen based polymer chemistries. Not wishing to be bound by theory, it is believed that the surface chemistry of nitrogen based polymeric yarns works in concert with the formulation chemistry described herein to create an especially efficient superabsorbent coating. In general, coating produced on polyester yarns achieve 350 g water absorbed per gram of dry hydrogel coating and coatings produced on aramid yarns achieve 575 g water absorbed per gram of dry hydrogel coating. This feature further underscores the formulation utility wherein specific formulations can be created for yarns based on nitrogen chemistries verses polyester type yarns. For example, a formulation containing approximately 11 percent solids coated at approximately 5.7 weight percent on aramid (FIG. 6A, sample 1) can achieve a comparable water absorption quantity as a formulation containing approximately 17.5 percent solids coated at approximately 10.3 weight percent coating on polyester (FIG. 6B, sample 3). Each coating produces 35.2 and 36.2 gram water per gram yarn, respectively. This feature further underscores the ability to accommodate specific yarn chemistries while maximizing the speed of absorption, flexibility, and total quantity of water absorbed.

Furthermore, it can be envisioned that a primer or precoating based on but not limited to polyurethane, polyamide chemistries or other nitrogen based chemistries, could be applied to the yarn prior to coating with the liquid composition during processing. This strategy would effectively maximize the absorption capacity of the dry hydrogel coating on any yarn type similar to the aramid results previously described.

Example 3: Evaluation of Viscosity of the Compositions

Figure 7:
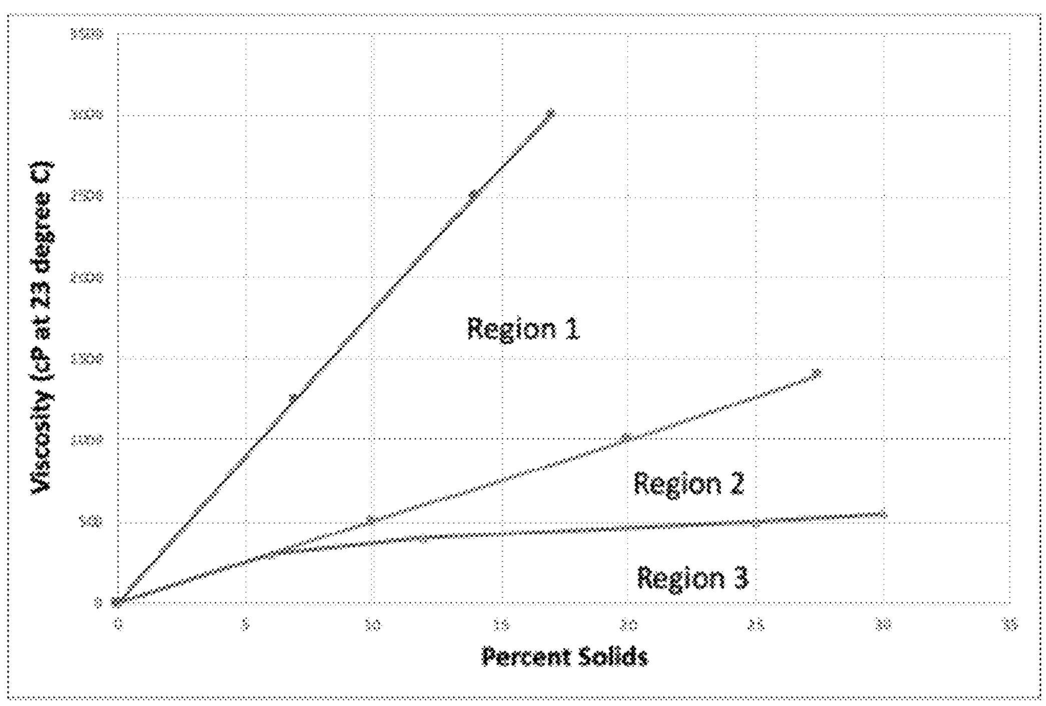
FIG. 7 is a graph showing viscosity and weight percent solids relationship of polymers of type 1 in Region 1, polymers of type 1 in Region 2, and compositions comprising polymers of type 1 and polymers of type 2 in region 3.

FIG. 7 illustrates the relationship between viscosity and weight percent solids, but not limited to disclosed ranges, of polymers of the first type in Region 1, polymers of the second type in Region 2, and an example composition containing polymers of the first type and polymers of the second type in Region 3. The viscosities were determined using a Brookfield rheometer in according to methods know in the art. Combinations of various polymers of the first type and second type can provide a more desirable viscosity, which can depend on molecular weight, polydispersity (number based molecular weight average versus mass based molecular weight average), degree of branching, relative ratios of m, n, and o previously described related to the first polymer type. The unexpected benefit of combing acrylates polymers of the first type with non-acrylate polymers of the second type defined by these regions give rise to the desirable, unique properties associated with the liquid compositions described herein. Polymers of the first and second type can be chosen such that the viscous properties and solids content can be tailored to specific physical properties and application techniques that include but not limited to, dip coating, transfer roll applications, printing, or other applications known in the art to functionalize surfaces with the water swellable coatings described herein.

Figure 8:
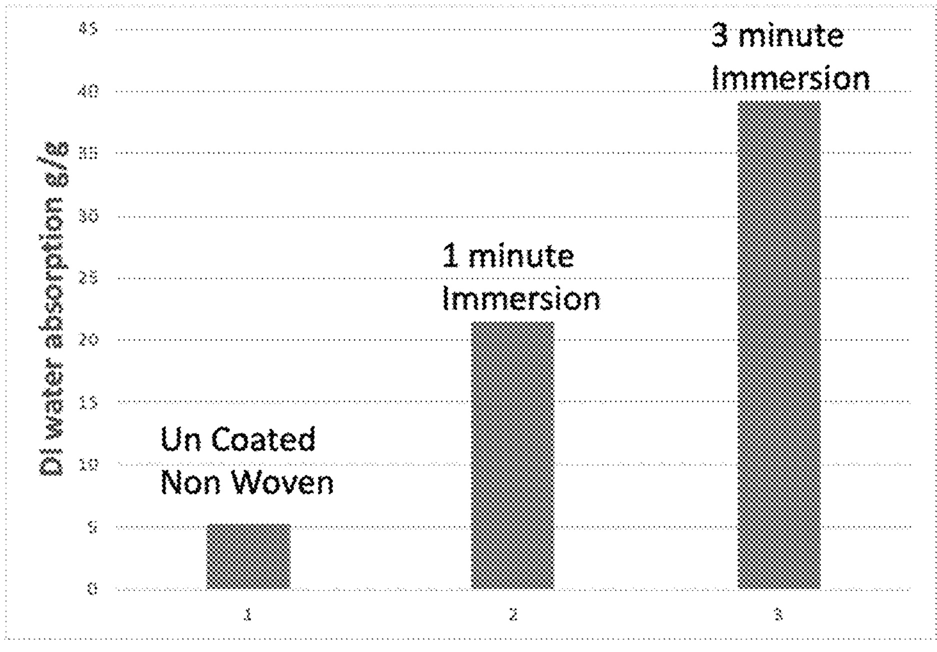
FIG. 8 is a graph showing water absorption of uncoated non-woven material, and non-woven material coated with compositions disclosed herein and immersed in water for 1 minute and 3 minutes. The compositions were applied to non-woven material, 2.0-2.1 mg/square inch basis weight, at about 10 weigh percent dry coating and thermally processed at about 140° C. for 5 minutes.

Example 4: Evaluation of Water Absorption Properties on Non-Woven Substrates FIG. 8 illustrates the utility of compositions described herein applied to non-woven substrates of 20-21 mg/sq. inch basis weight at about a 10 weight percent dry coating, wherein weight percent dry coating refers to the percent of the coating on the yarn (weight coating/(weight coating+yarn)) determined post processing. Liquid compositions having, but not limited to, 3 to 25 weight percent solids and viscosity of 50 to 250 centipoise were aerosolized to apply uniform, or non-uniform, or non-continuous, or continuous coatings to the non-woven material. Upon thermal processing at 135° C. to 145° C. for 5 to 10 minutes, water absorptive coatings were formed capable of reaching about 40 grams of water per gram of coated material within 3 minutes of immersion followed by a 30 second drip prior to the weight determination. The coated non-woven had excellent flexibility and no stiffness. The coating had excellent adhesion and did not flake or dust. In addition, the coated material showed about a 4-fold improvement in water absorption within 1 minute over the non-coated material, and about an 8-fold improvement in water absorption within 3 minutes over the non-coated material. Surprisingly, a process of applying the aerosolized composition and essentially simultaneously thermally crosslinking composition while removing the carrier water resulted in a further improvement in the speed of absorption. For example, an approximate 20% increase in the one minute absorption data was attained by simultaneously spray coating and heating the non-woven material. Without wishing to be bound by theory, it is believed that the liquid composition transformed to a gel state effectively preventing wicking of the liquid composition into the non-woven material, essentially keeping more of the superabsorbent material at the surface, allowing it to quickly absorb water.

Figure 9:
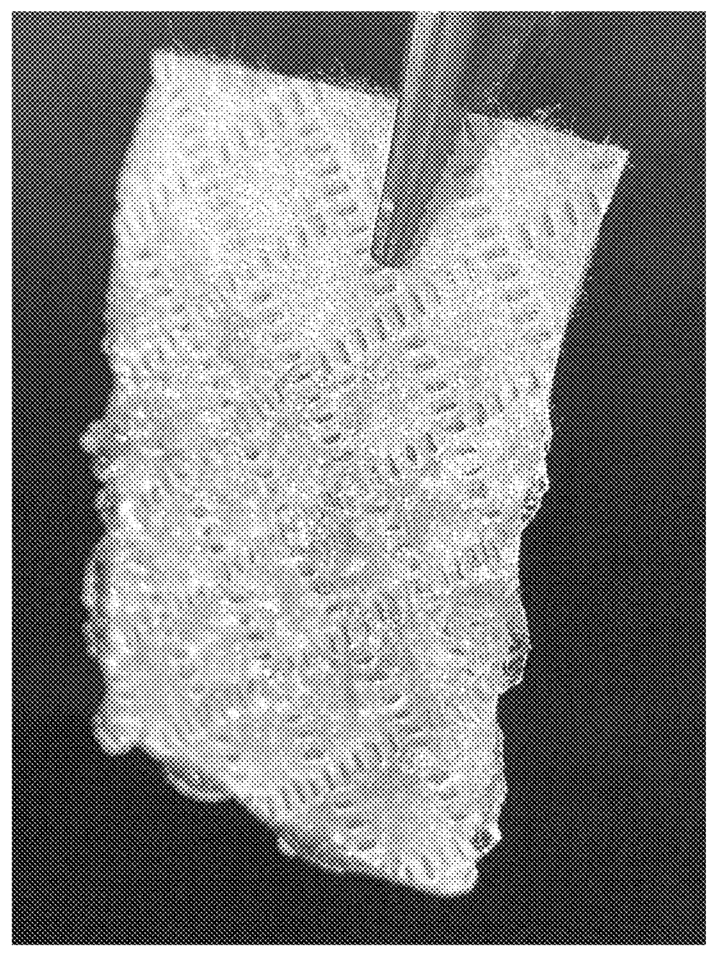
FIG. 9 is an image of a treated polypropylene nonwoven substrate partially dipped into water.

Example 5: Evaluation of Water Absorption Properties on Polypropylene Non-Woven Substrates FIG. 9 shows a treated polypropylene nonwoven substrate partially dipped into water, showing the swollen gel structure formed by the absorbent coating. The absorbent coating was formed from Composition 7 of Example 1. The formulation was applied to the nonwoven substrate using a spray coating process to create a uniform non-continuous coating consisting of approximately 20-50 micron patches within the surface of the non woven. The spray coated nonwoven material was subsequently heated at 135° C. to 140° C. for 7 minutes in a laboratory oven. The final coating level ranged from about 25 to 30 wt. % of the treated nonwoven.

Figure 10:
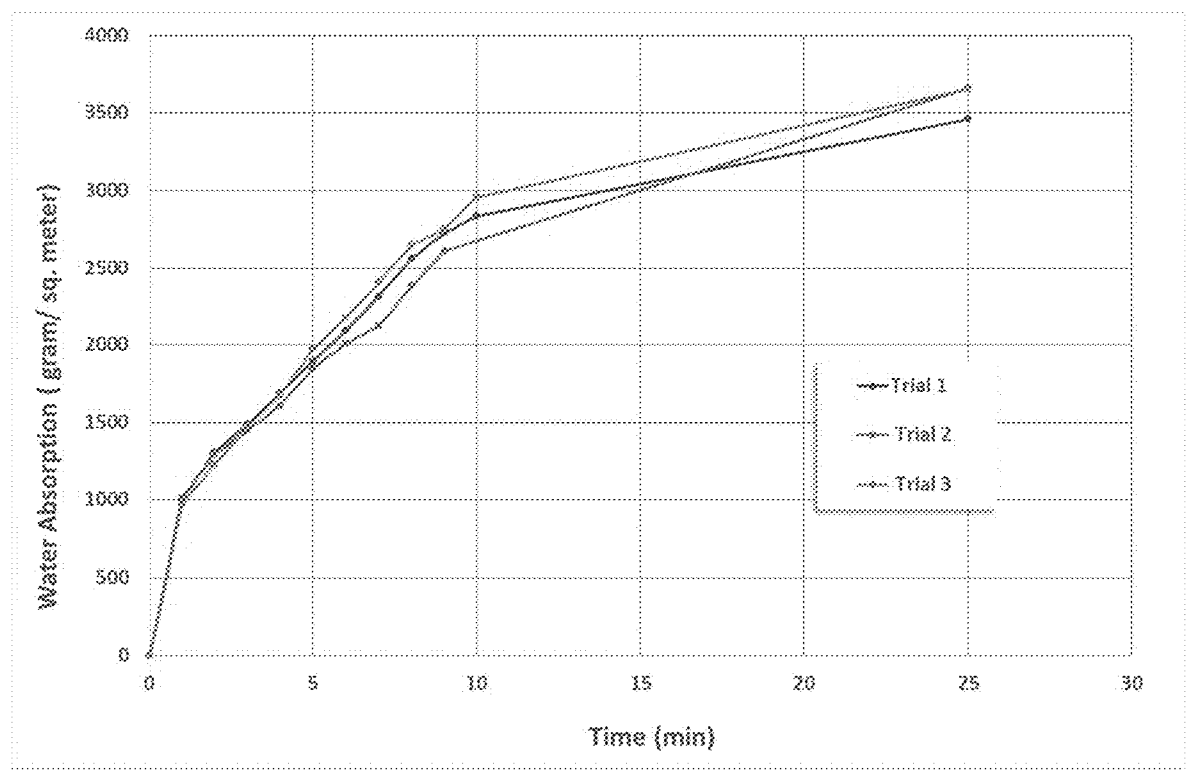
FIG. 10 is a graph showing water (DI) absorption versus exposure time for an example absorbent coating on a polypropylene non-woven 60 grams per square meter (gsm) substrate.

FIG. 10 shows the water (DI) absorption versus exposure time for the example coating formed from Composition 7 of Example 1 on a polypropylene non-woven 60 grams per square meter (gsm) substrate, with the coating level of about 25 to 30 wt. %. As shown in FIG. 10, the coated substrate absorbed about 1000 gsm water (DI) within one minute, and absorbed about 3500 gsm water (DI) within 25 minutes.

Figure 11:
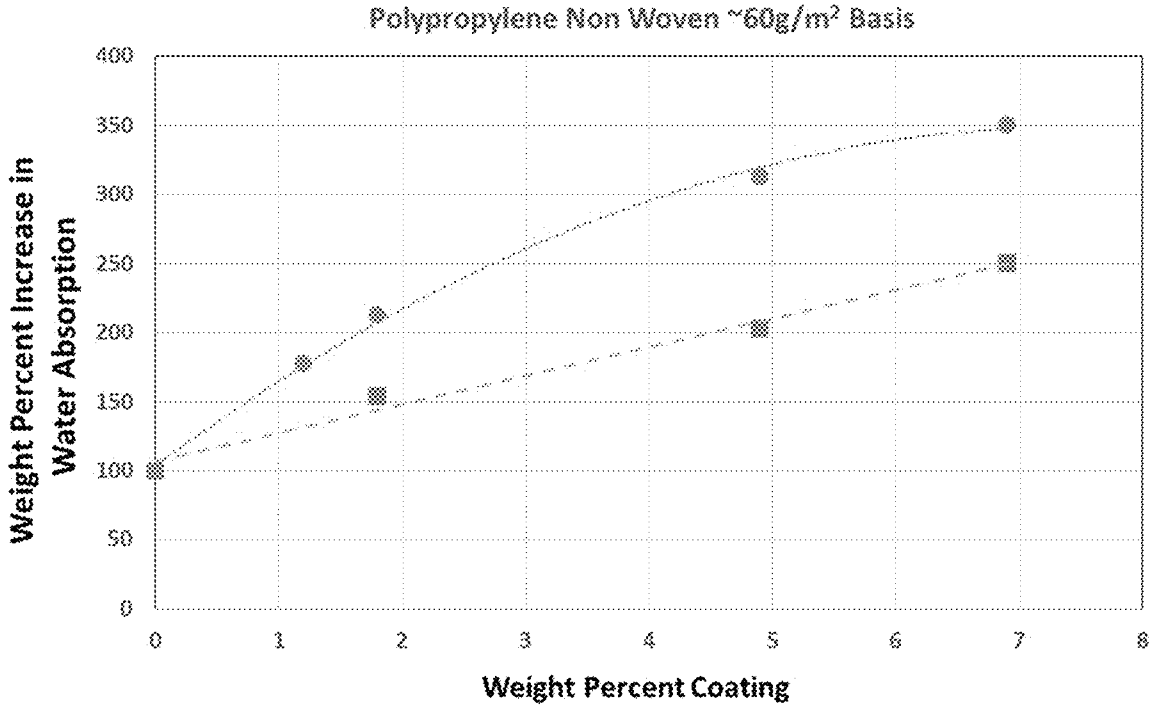
FIG. 11 is a graph showing the relationship between absorption and coating level (wt. % coating) for an example absorbent coating on polypropylene non-woven at about 60 gsm basis.

FIG. 11 shows the relationship between absorption and coating level (wt. % coating) for the example coating formed from Composition 7 of Example 1 on polypropylene nonwoven at about 60 gsm basis. This low solid, low viscosity composition was found to be well suited for hydrophobic substrates. FIG. 11 shows absorption for both DI water and 0.9% saline. As shown in FIG. 11, adjusting the coating level from 2 wt. % to 5 wt. % on polypropylene increased absorption by about 200% to about 300% in DI water; and increased the absorption by about 150% to about 200% in 0.9% saline.

Figure 12:
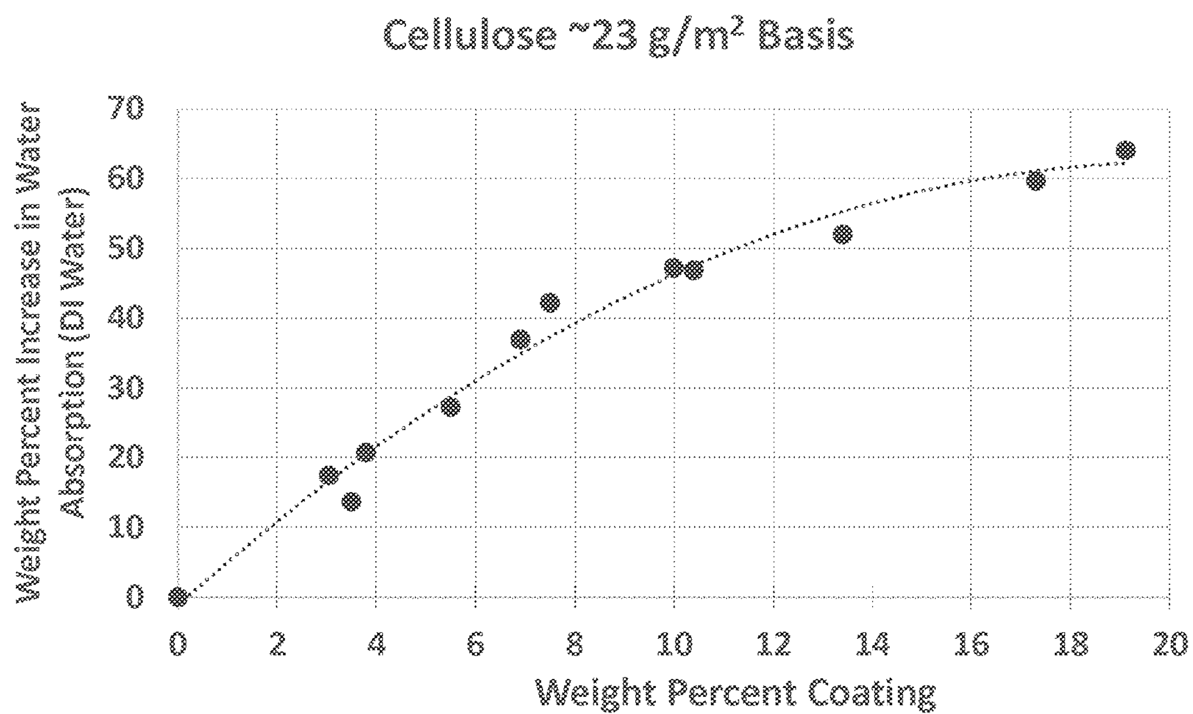
FIG. 12 is a graph showing the relationship between absorption and coating level for and coating level (wt. % coating) for an example absorbent coating on cellulosic non-woven at about 23 gsm basis.

Example 6: Evaluation of Water Absorption Properties on Cellulosic Non-Woven Substrates FIG. 12 shows the relationship between absorption and coating level for and coating level (wt. % coating) formed from Composition 11 of Example 1 on cellulosic non-woven at about 23 gsm basis. This high solids, high viscosity composition was found to be well suited for hydrophilic substrates. As shown in FIG. 12, adjusting the coating level from 5 wt. % to 10 wt. % on cellulose increased the absorption of DI water by about 25% to about 50%. It was found that spray coating techniques that control droplet size, placement, and degree of coverage are ideal application methods.

Example 7: Evaluation of Water Absorption Properties on Polypropylene Non-Woven Substrates Two polypropylene non-woven substrates were utilized, Material 1 (measured basis wt 16.1 gsm, referred to herein as about 20 gsm) and Material 2 (measured basis wt ~26.5 gsm, referred to herein as about 30 gsm). Nonwoven materials were treated with Composition 8 of Example 1 using a dip coating application process to coat strips of Material 1 and Material 2. The coating level ranged from 22.2±1.6 wt % and 21.3±1.3 wt % on a dry weight basis for Material 1 and Material 2, respectively. The liquid composition (containing 20 wt. % solids) was diluted with water to achieve about 7 wt. % solids prior to use. In addition, the liquid composition was formulated to quickly "wet" the hydrophobic, nonwoven materials for uniform, even coating.

The coated samples were suspended on a support rack and placed in an oven set at 120° C. to 125° C. for 3, 5, and 7 minutes to determine the impact of curing time on the absorption properties. Six samples per condition were made for each basis weight material.

Test samples were cut from the treated nonwoven materials, weighed, then placed in deionized water for 1, 2, 3, 4, 5, 6 and 7 minutes. The sample was removed at each time increment and excess water allowed to drain prior to re-measuring the weight. The water absorption was calculated in terms of g/g of treated nonwoven and g/g absorbent material (e.g., dry coating).

Figure 13A:
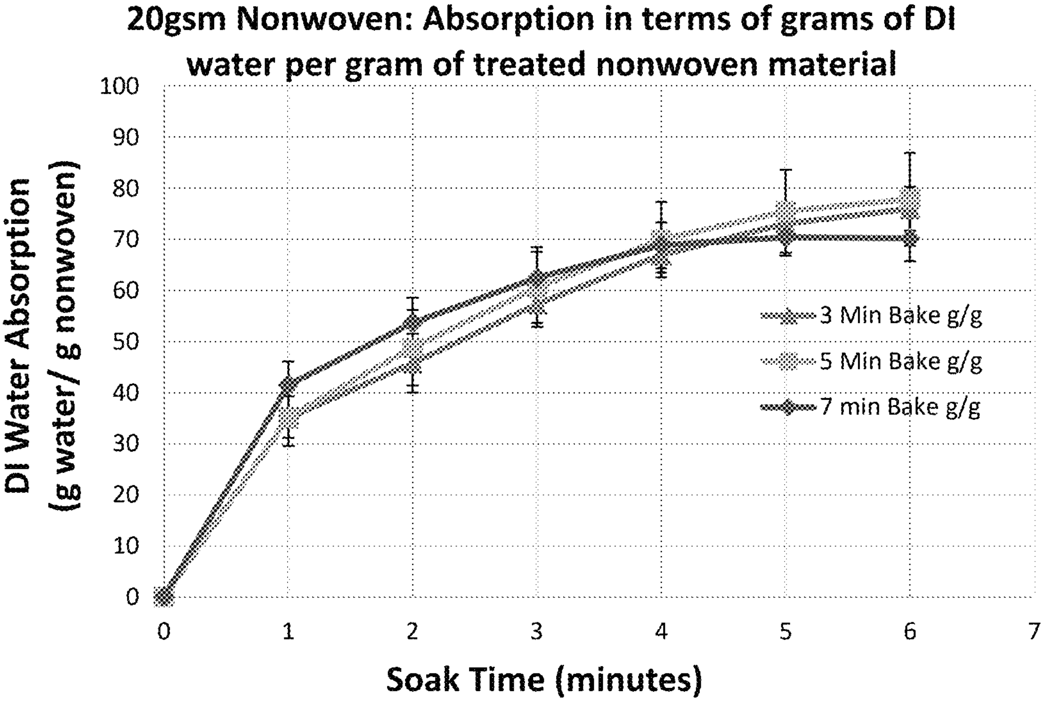
FIG. 13A is a graph showing absorption in terms of grams of DI water per gram of treated non-woven material for a 20 gsm non-woven substrate.
Figure 13B:
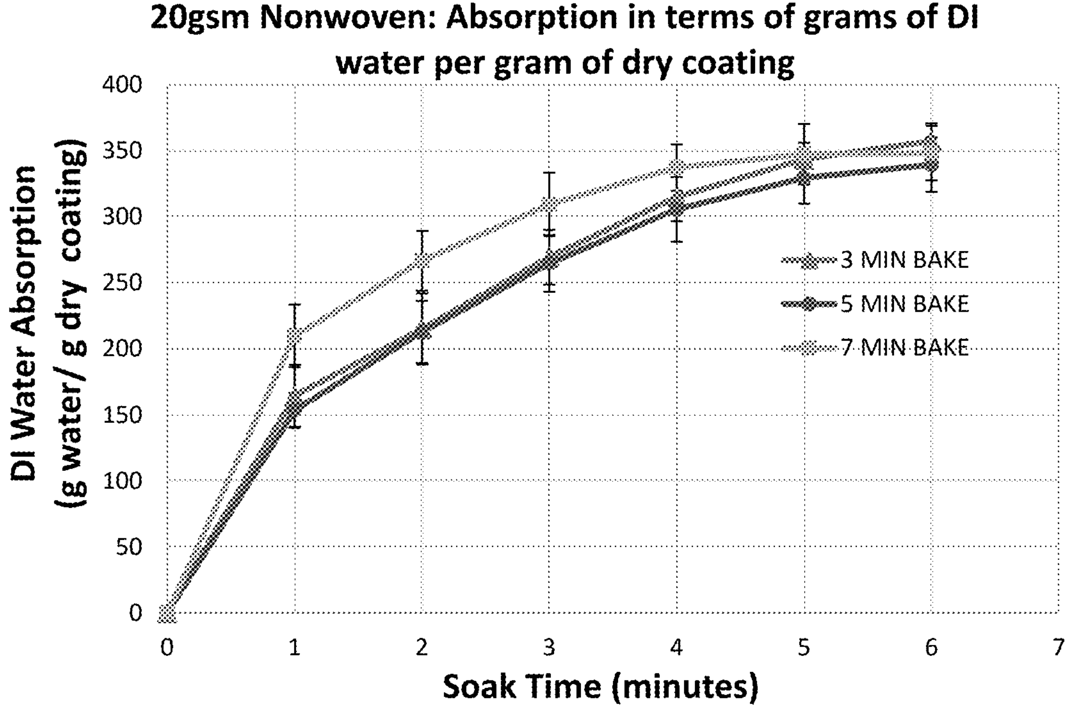
FIG. 13B is a graph showing absorption in terms of grams of DI water per gram of absorbent coating for a 20 gsm non-woven substrate.

FIG. 13A shows the water absorption on Nonwoven Material 1 in terms of grams of DI water per gram of treated nonwoven material. FIG. 13B shows the water absorption on Nonwoven Material 1 in term of grams of DI water per gram of dry coating. The dry coating level for all samples was 22.2±1.6 wt. %. All samples were found to meet absorption targets (Targets: 19-26.7 g/g treated nonwoven and 100-133 g/g dry coating) within about 1 minute under test conditions. Generally, under all test conditions, the absorption profiles were found to be independent of bake time. A maximum of about 75 g/g or about 350 g/g dry coating was achieved for all bake times at 120° C. to 125° C.

Figure 14A:
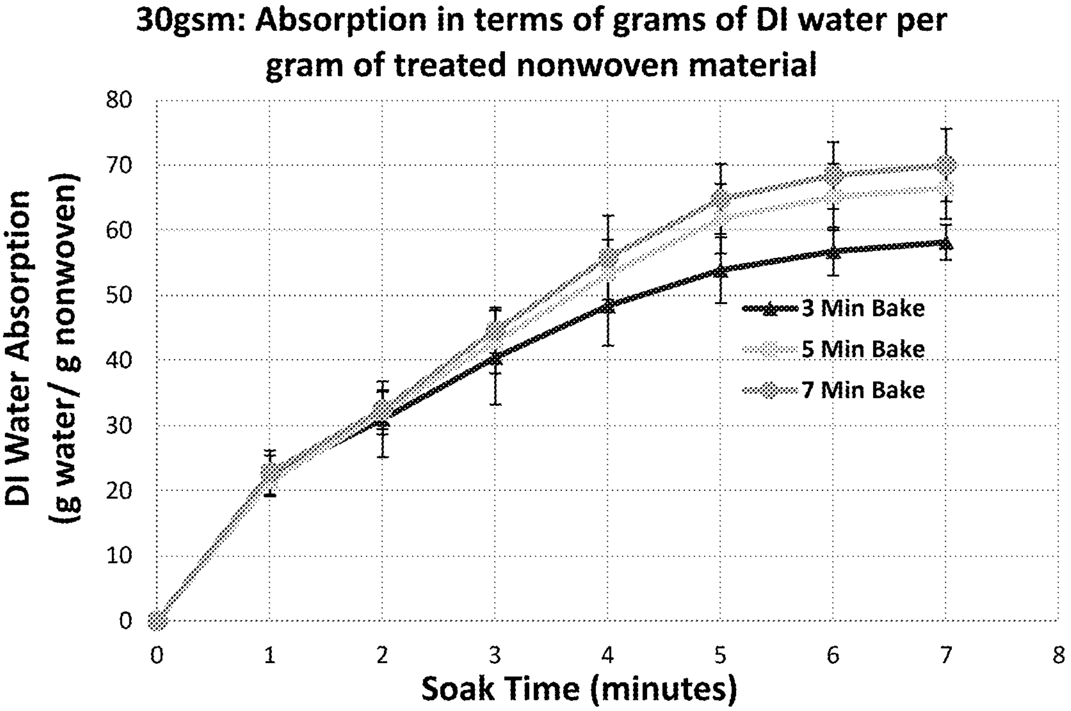
FIG. 14A is a graph showing absorption in terms of grams of DI water per gram of treated non-woven material for a 30 gsm non-woven substrate.
Figure 14B:
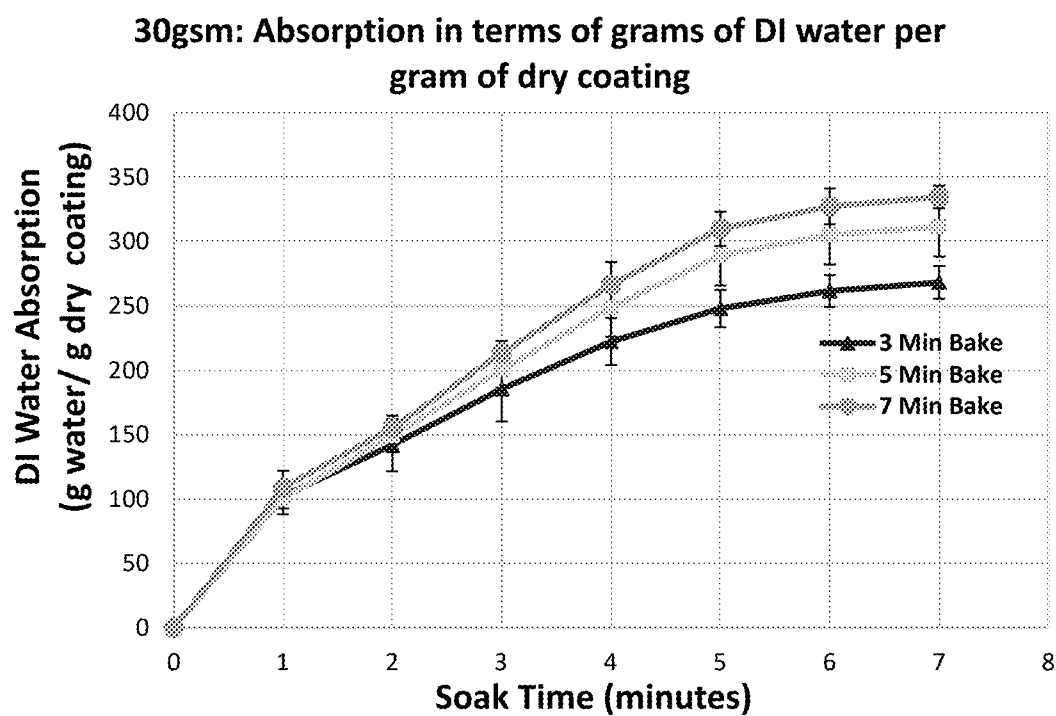
FIG. 14 B is a graph showing absorption in terms of grams of DI water per gram of absorbent coating for a 30 gsm non-woven substrate.

FIG. 14A shows the water absorption on Nonwoven Material 2 in terms of grams of DI water per gram of treated nonwoven material. FIG. 14B shows the water absorption on Nonwoven Material 2 in term of grams of DI water per gram of dry coating. The dry coating level for all samples was 21.3±1.6 wt. %. All samples were found to meet absorption targets (Targets: 19-26.7 g/g treated nonwoven and 100-133 g/g dry coating) within about 1-2 minutes under test conditions. At shorter bake times, the maximum absorption diminished due to suboptimal conditions to form coating. A maximum of about 70 g/g or about 325 g/g dry coating was achieved for bake times of 5 minutes and 7 minutes at 120° C. to 125° C.

Figure 15:
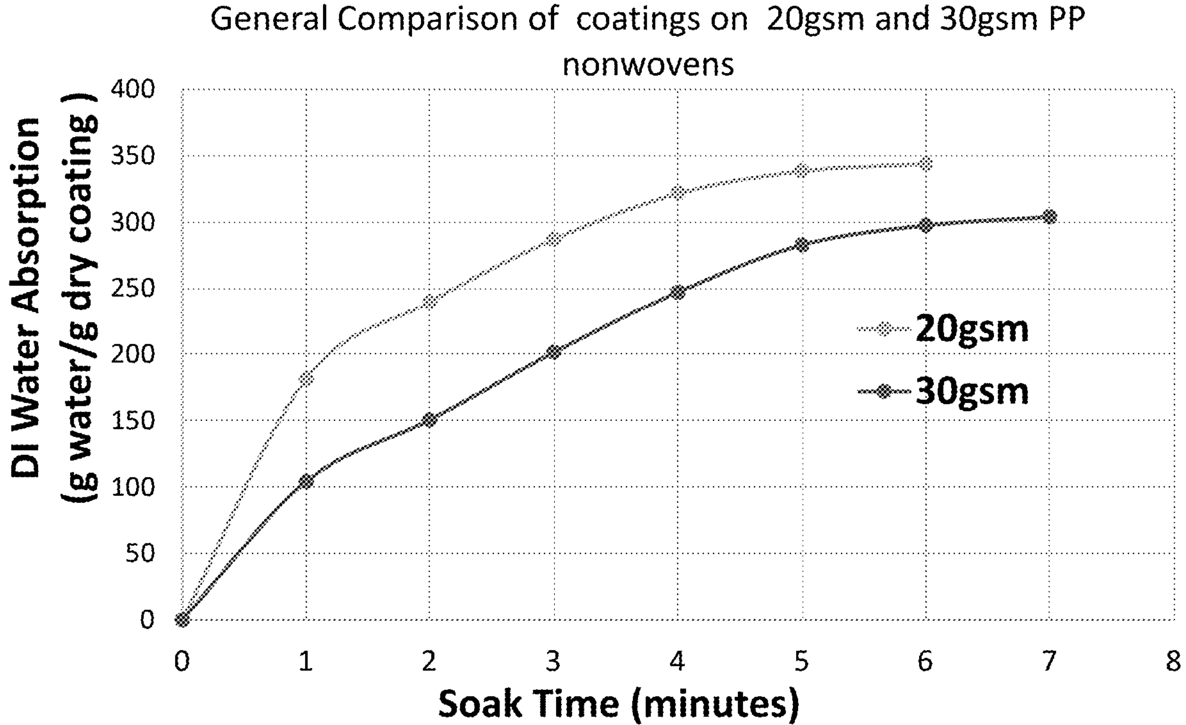
FIG. 15 is a graph showing a comparison of absorption for example coatings on 20 gsm and 30 gsm polypropylene non-woven substrates.

FIG. 15 shows an absorption comparison of Material 1 (about 20 gsm) and Material 2 (about 30 gsm) processed under the same conditions. The liquid composition on hydrophobic polypropylene nonwoven materials can achieve high absorption efficiency of about 300 to about 350 g water/g dry coating in deionized water. Higher basis weight materials can impact the curing kinetics of the liquid composition and absorption profiles. The liquid formulations formed coatings that had strong adhesion with no dusting or flaking.

Example 8: Evaluation of Water Absorption Properties on Non-Woven Substrates

Two non-woven substrates were utilized, Material 1 (measured basis wt. ~88-90 gsm) and Material 2 (measured basis wt. ~58-60 gsm).

Non-Woven materials were treated with Composition 8 of Example 1 using a spray application process to coat sides designated as 1) Exterior side and 2) Exterior side and Interior side. The coating level ranged from about 5 wt. % to 30 wt. % on a dry basis. This Example shows that using a spray technique to control the coating level is possible as well as creating a single side or a dual side coating, resulting in an absorbent surface and a hydrophobic surface on opposite surfaces of a substrate.

Sprayed samples were suspended on a rack and placed in an oven set at 125° C. to 135° C. for 6 to 7 minutes.

Test samples were cut from the treated non-woven materials, weighed, then placed in deionized water for 1, 2, 4, 8, 12, and 16 minutes. The sample was removed at each time increment and excess water allowed to drain prior to re-measuring the weight. The water absorption was calculated on a g/g and $g/m^2$ basis and compared to the non-coated material.

Figure 16A:
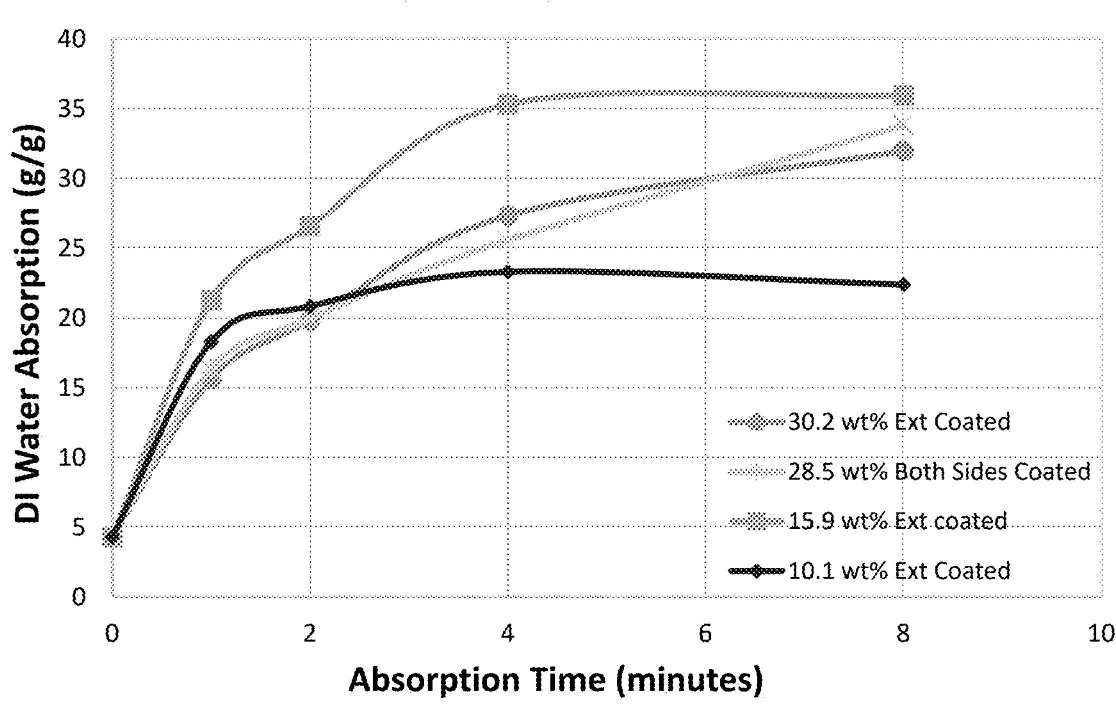
FIG. 16A is a graph showing absorption in terms of grams water per gram of treated non-woven for a 60 gsm non-woven substrate.
Figure 16B:
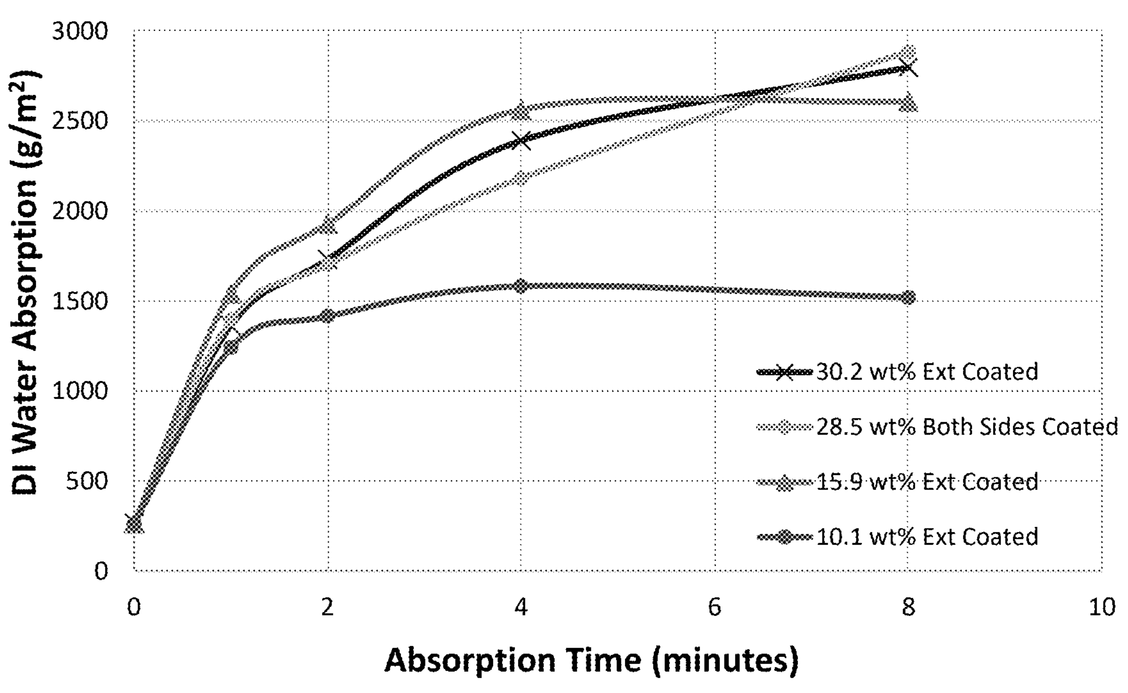
FIG. 16B is a graph showing absorption in terms of grams water per square meter of non-woven for a 60 gsm non-woven substrate.

FIG. 16A shows the water absorption on Nonwoven Material 2 in terms of grams of water per gram of treated nonwoven material. FIG. 16B shows the water absorption on Nonwoven Material 2 in term of grams of water per square meter of treated nonwoven material. FIGS. 16A and 16B show absorption for samples of varying wt. % coatings on the exterior side and on for 28.5 wt. % on both sides.

Figure 17A:
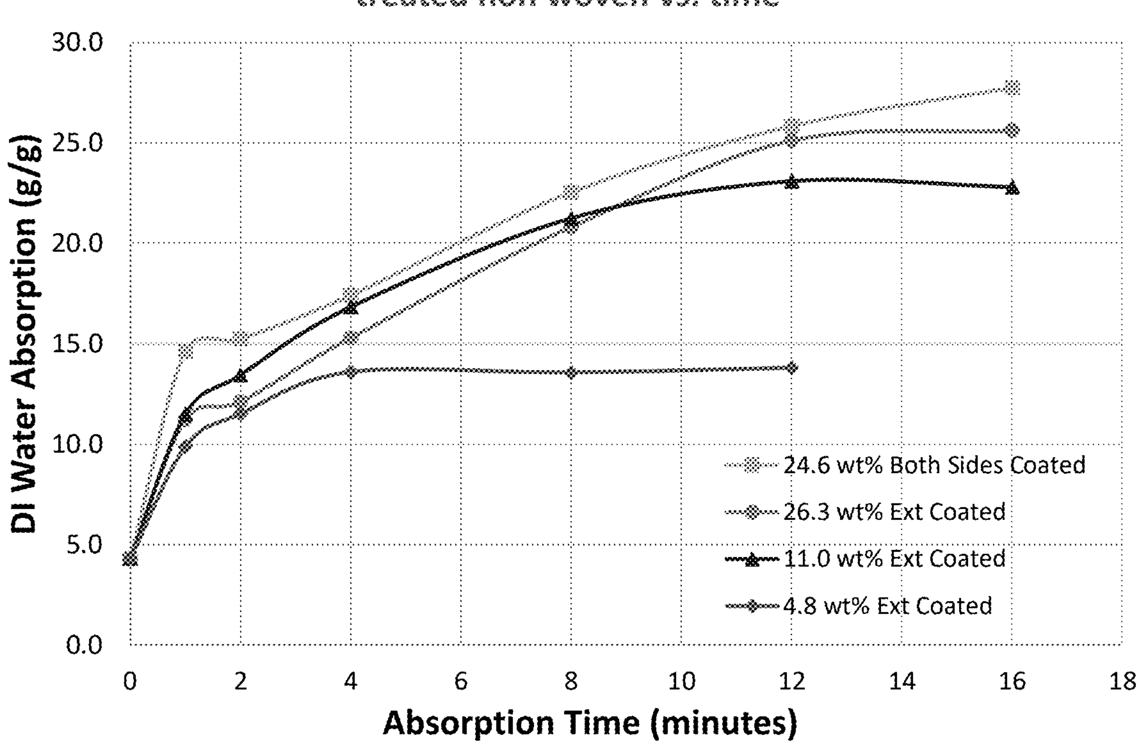
FIG. 17A is a graph showing absorption in terms of grams water per gram of treated non-woven for a 90 gsm non-woven substrate.
Figure 17B:
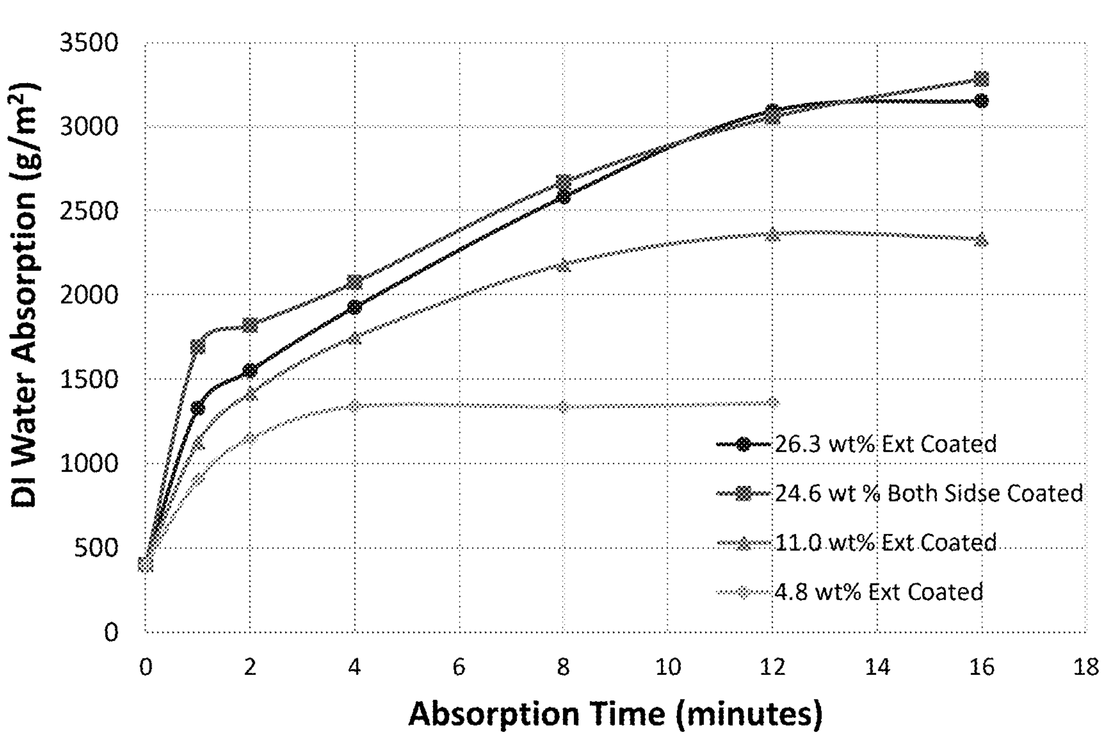
FIG. 17B is a graph showing absorption in terms of grams water per square meter of non-woven for a 90 gsm non-woven substrate.

FIG. 17A shows the water absorption on Nonwoven Material 1 in terms of grams of water per gram of treated nonwoven material. FIG. 17B shows the water absorption on Nonwoven Material 1 in term of grams of water per square meter of treated nonwoven material. FIGS. 17A and 17B show absorption for samples of varying wt. % coatings on the exterior side and on for 24.6 wt. % on both sides.

Figure 18:
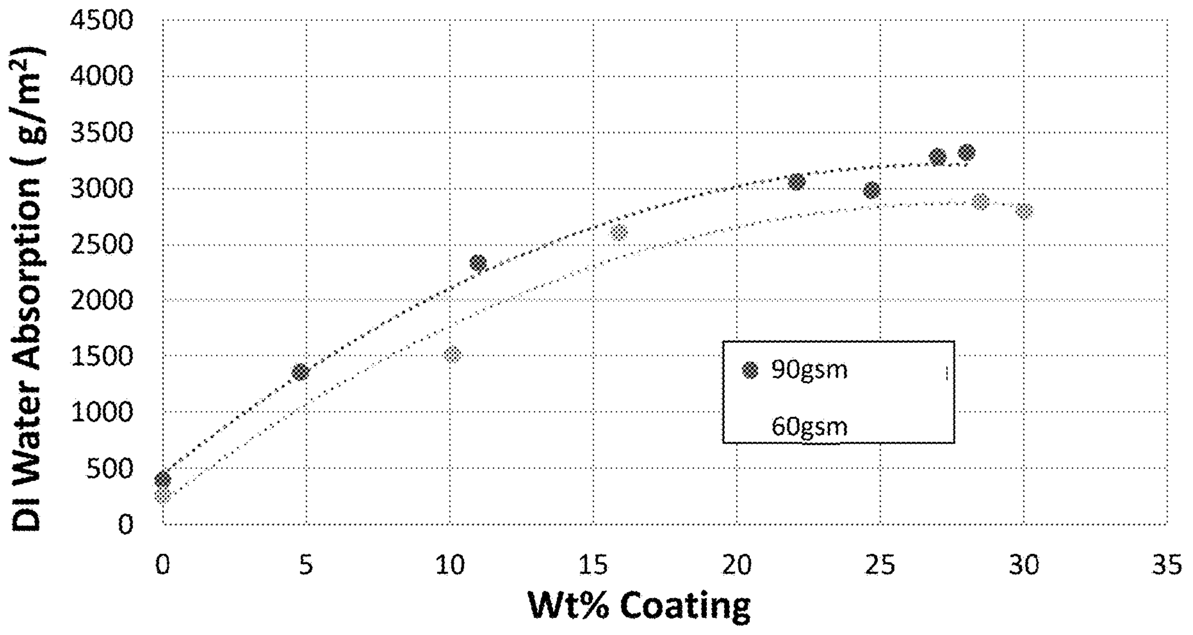
FIG. 18 is a graph showing a comparison of absorption for example coatings on 60 gsm and 90 gsm non-woven substrate.

FIG. 18 shows a comparison of the absorption for the coatings at varying coating levels on both Material 1 (about 90 gsm) and Material 2 (about 60 gsm). The absorption rate was found to decrease above the 16-20 wt. % coatings due to the "gel blocking" phenomenon. Over the 8 to 12 minutes DI water absorption test, samples with high wt. % coatings did not reach equilibrium and maximum absorption capacity. Longer exposure times were required to fully swell the coating.

Example 9: Evaluation of Water Absorption Properties of Absorbent Materials Formed from Liquid Compositions (without a Substrate)

Figure 19A:
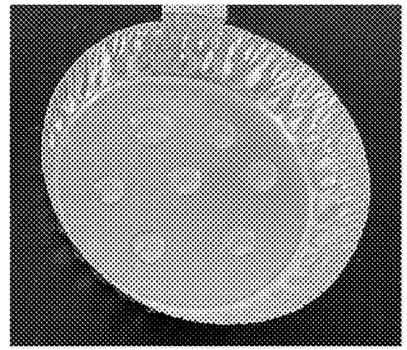
FIG. 19A is an image of example liquid compositions pre-bake.
Figure 19B:
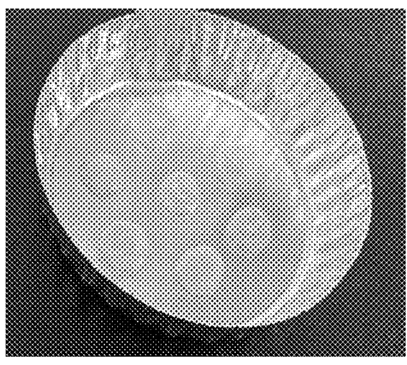
FIG. 19B is an image of solid absorbent material formed from the example liquid compositions after baking.
Figure 19C:
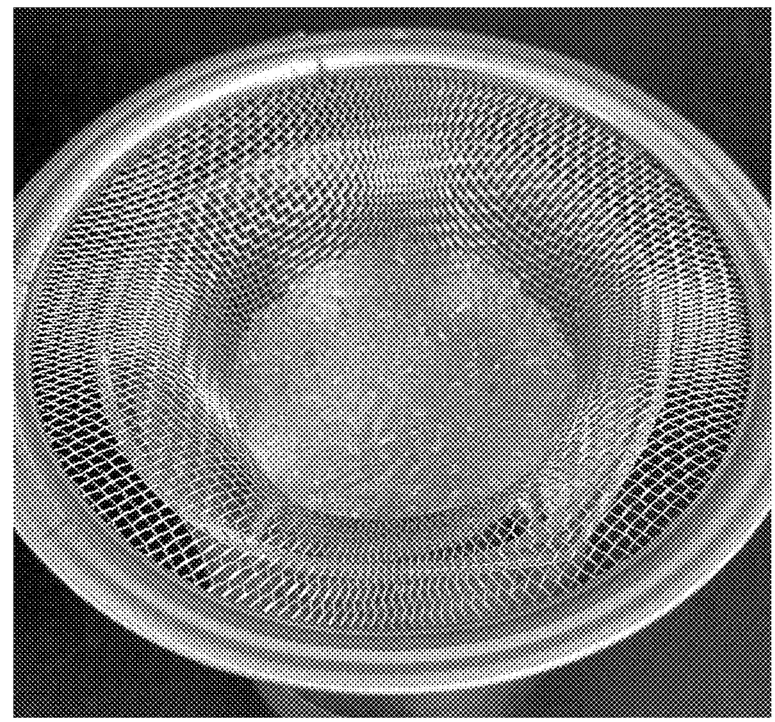
FIG. 19C is an image of the solid absorbent material after soaking in water and draining.
Figure 19D:
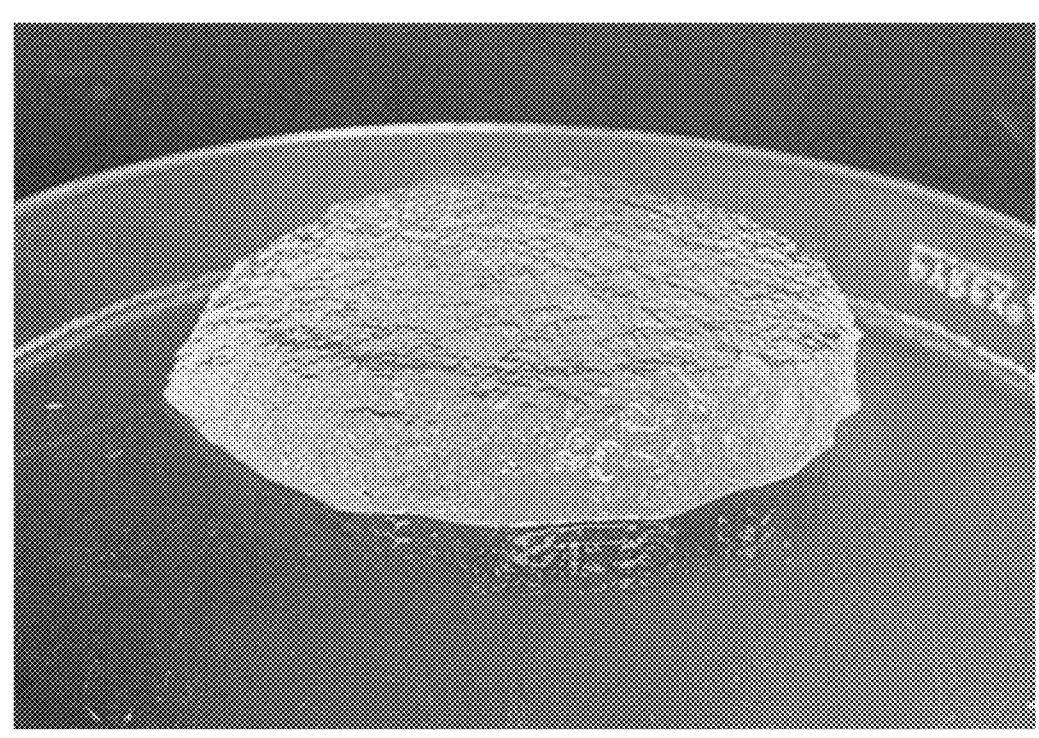
FIG. 19D is an image of the gelled absorbent material after exposure to water.

Composition 8 of Example 1 (FIG. 19A) was baked at 150° C. for 10 minutes (FIG. 19B) to form a solid absorbent material. The solid absorbent material was soaked in DI water for 10 minutes, and allowed to drain for 1 minute (FIG. 19C). FIG. 19D shows that the absorbent material formed a gel upon exposure to water, and absorbed about 250-300 g water/g absorbent material.

Figure 20:
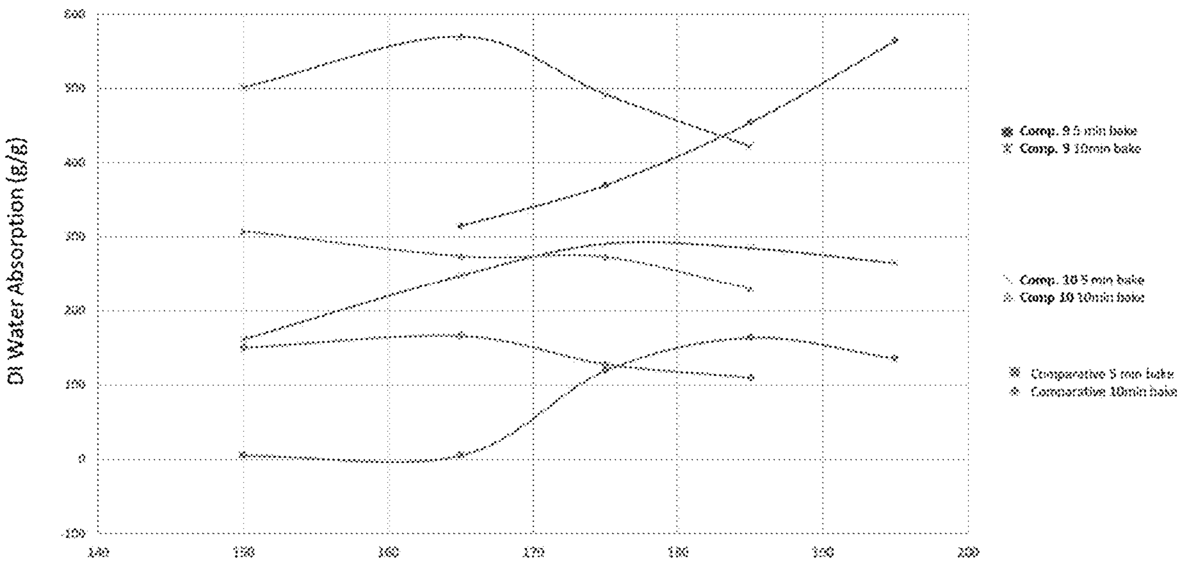
FIG. 20 is a graph showing absorption results for two example compositions, Composition 9 and Composition 10 of Example 1, and a comparative absorbent coating, which were each baked for 5 or 10 minutes.

FIG. 20 shows the absorption results for two example compositions, Composition 9 (Comp. 9) and Composition 10 (Comp. 10) of Example 1, and a comparative absorbent coating representing an industry standard with about 20 wt. % total solids, that were each baked for 5 or 10 minutes. The example coatings were found to be well suited for fast and hot processing. For example, Comp. 9, 10 minute bake achieved a water absorption of 500 g/g at 150° C., and Comp. 10, 10 minute bake achieved a water absorption of 300 g/g at 150° C. In contrast, the comparative sample, 10 minute bake had a water absorption of 150 g/g at 150° C. Comp. 9, 5 minute bake achieved a water absorption of 564 g/g at 195° C. and Comp. 10, 5 minute bake achieved a water absorption of 265 g/g at 195° C. In contrast, the comparative sample, 5 minute bake had a water absorption of 135 g/g at 195° C.

Example 10: Evaluation of Curing Conditions on Water Absorption Properties

FIG. 21 shows water absorption versus curing temperature, when the liquid composition is exposed to the temperature for 60 seconds or 90 seconds. Composition 10 of Example 1 was applied to 1700 Dtex Polyester yarn at 20 wt. % dry coating, and the thermal processing conditions to cure the coating were varied. At lower temperatures, increase of exposure time can form an efficient superabsorbent coating. At higher temperatures, decrease of exposure time can form an efficient superabsorbent coating.

This Example demonstrates the rapid reaction kinetics of the composition and as such is suitable for high speed processing. FIG. 21 illustrates that it is possible to achieve high performing absorbent coatings by a hotter, faster (shorter thermal exposure time) processes and by a cooler, slower (longer thermal exposure) time. This feature adds to the utility of the liquid compositions disclosed herein, as the compositions accommodate a broad range of processing conditions.

Example 11: Evaluation of Flexibility and Durability of Yarns Treated with Liquid Compositions Polyester yarns (1111 Dtex) treated with the compositions described herein, and thermally processed to form an absorbent coating on the yarn, were evaluated for potential dusting with a stress test. A 1 m length of treated yarn was affixed to a 1.5 lb. weight and pulled at a constant rate over a stationary, horizontal, 5 mm smooth stainless steel rod so that the 1 meter yarn contacted about 25% of the diameter of the rod, simulating a 90 degree bend. The rod was cycled forward and backward twice to simulate line tension and wear during processing. The force was approximately 270 pounds per square inch at the contact area.

The coated yarns were qualitatively assessed for dusting or flaking to determine the flexibility and coating adhesion. Example yarns coated with the compositions disclosed herein were found to be non-friable (i.e., flexible and durable) when subjected to the stress test.

Each reference, including all patent, patent applications, and publications, cited in the present application is incorporated herein by reference in its entirety.

What is claimed is:

1. A liquid composition comprising:

a first polymer type comprising one or more acrylate polymer, a second polymer type comprising one or more non-acrylate polymer, a crosslinking agent, wherein the crosslinking agent is suitable for crosslinking the acrylate polymer of the first polymer type, the acrylate polymer of the first polymer type with the non-acrylate polymer of the second polymer type, the non-acrylate polymer of the second polymer type, or a combination thereof, and the crosslinking agent is selected from polyepichorohydrin amines, quaternary amines, amides peroxides, peroxodisulfate, photoactive transition metal catalysts, brominate acrylates, polyaldehydes, and propenyl compounds; and water;

wherein the liquid composition is suitable to provide an absorbent material having a water absorption capacity of at least about 50 grams of water per gram of absorbent material.

2. The liquid composition of claim 1, wherein the first polymer type and the second polymer type have a weight ratio of about 1:0.3, about 1:1, or about 1:2.5.

3. The liquid composition of claim 1, wherein an amount of the second polymer type is about equal to or greater than the first polymer type.

4. The liquid composition of claim 1, wherein the acrylate polymer is anionic, cationic, or zwitterionic.

5. The liquid composition of claim 4, wherein the acrylate polymer includes one or more functional groups selected from carboxylic acids, acrylamides, sulfonates, metal salts or combinations thereof.

6. The liquid composition of claim 1, wherein the acrylate polymer has a formula of

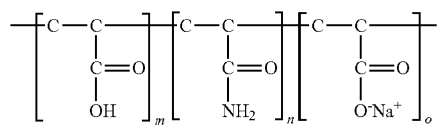

wherein m is a mole fraction of the carboxylic acid, n is a mole fraction of the acrylamide, and n is the mole fraction of the metal salt, whereby the sum of m, n, and o is 100%.

7. The liquid composition of claim 1, wherein the acrylate polymer has a molecular weight of less than about 100,000 kilodaltons.

8. The liquid composition of claim 1, wherein the non-acrylate polymer is a water-soluble polymer.

9. The liquid composition of claim 8, wherein the water-soluble polymer is polyethylene glycol.

10. The liquid composition of claim 8, wherein the non-acrylate polymer is nonionic.

11. The liquid composition of claim 8, wherein the non-acrylate polymer includes one or more functional groups selected from OH, $NH_2$, Cl, Br, carbocyclic, sulfonate, esters, ethers, amides, urethane, quaternary amines, and organic salts.

12. The liquid composition of claim 1, wherein the liquid composition comprises between about 0.01 wt. % to about 10 wt. % of the crosslinking agent.

13. The liquid composition of claim 1, wherein the liquid composition comprises at least 75 wt. % water; or the liquid composition comprises about 63.8% water.

14. The liquid composition of claim 1, further comprising one or more additives selected from fumed silica, aluminosilicate clays, carbon black, pigments, surfactants, plasticizers, adhesion promoters, yarn processing aids, silicones, sizing agents, biocides, conducting particles, conducting polymers, non-conducting particles, non-conducting polymers, pigments and combinations thereof.

15. The liquid composition of claim 14, wherein the one or more additives each have an average diameter of less than about 50 microns.

16. The liquid composition of claim 1, wherein the liquid composition has a viscosity less than about 2500 cP at 23° C., less than about 500 centipoise at 23° C., less than about 250 centipoise at 23° C., or less than about 100 centipoise at 23° C.

17. The liquid composition of claim 16, wherein the liquid composition has a total solids content of up to 60 wt. %.

18. An absorbent material formed by crosslinking the liquid composition of claim 1.

19. The liquid composition of claim 1, wherein the absorbent material has a water absorption capacity of at least about 100 grams of water per gram of absorbent material.

20. The liquid composition of claim 1, wherein the absorbent material has a water absorption rate of at least 80% of the water absorption capacity within 30 seconds of exposure to water.

21. The liquid composition of claim 1, wherein the acrylate polymer has a molecular weight in a range from about 200,000 daltons to about 500,000 daltons.

22. The liquid composition of claim 1, comprising:

about 0.1 wt. % to about 25 wt. % of the first polymer type;

about 0.1 wt. % to about 25 wt. % of the second polymer type; and about 0.01 wt. % to about 10 wt. % of the crosslinking agent.

23. The liquid composition of claim 1, wherein the liquid composition comprises an aqueous solution comprising the first polymer type.

* * * * *